United States Patent
Sahin et al.

(10) Patent No.: US 12,278,363 B1
(45) Date of Patent: Apr. 15, 2025

(54) MULTIPLE MORPHOLOGY COMPOSITE CATHODE MATERIALS PROVIDING HIGH ENERGY AND LONG CYCLE LIFE AND CELLS EMPLOYING THE SAME

(71) Applicant: CAMX Power, LLC, Lexington, MA (US)

(72) Inventors: Kenan E. Sahin, Lexington, MA (US); Jennifer A. Nelson, Lexington, MA (US); Kenneth Rosina, Lexington, MA (US); Sharon Dalton-Castor, Lexington, MA (US)

(73) Assignee: CAMX Power, LLC, Lexington, MA (US)

( * ) Notice: Subject to any disclaimer, the term of this patent is extended or adjusted under 35 U.S.C. 154(b) by 0 days.

(21) Appl. No.: 18/648,585

(22) Filed: Apr. 29, 2024

(51) Int. Cl.
*H01M 4/505* (2010.01)
*H01M 4/36* (2006.01)
(Continued)

(52) U.S. Cl.
CPC ........... *H01M 4/505* (2013.01); *H01M 4/364* (2013.01); *H01M 4/525* (2013.01);
(Continued)

(58) Field of Classification Search
None
See application file for complete search history.

(56) References Cited

U.S. PATENT DOCUMENTS

| 3,633,003 A | 1/1972 | Talwani |
| 5,339,684 A | 8/1994 | Jircitano et al. |

(Continued)

FOREIGN PATENT DOCUMENTS

| CA | 2373756 | 11/2000 |
| CN | 101071857 A | 11/2007 |

(Continued)

OTHER PUBLICATIONS

Lim, et al., Advanced functional Materials, 2015; vol. 25, pp. 4673-4680.

(Continued)

*Primary Examiner* — Zhongqing Wei
(74) *Attorney, Agent, or Firm* — Weston R. Gould; Dinsmore & Shohl LLP

(57) ABSTRACT

Provided are electrochemically active composite materials that include a first composition optionally of $Li_{1+a}MO_{2+b}$ (Formula I) where $-0.3 \leq a \leq 0.3$ and $-0.3 \leq b \leq 1.3$ and where M optionally includes 30 at % to 80 at % Mn and 30 at % to 75 at % Ni, the first composition formed of a polycrystalline morphology having a plurality of crystallites and a grain boundary between adjacent crystallites, the grain boundary including one or more enrichment elements, said one or more enrichment elements present at a higher atomic percentage than in an adjacent crystallite, wherein the one or more enrichment elements is selected from the group consisting of Co, Al, or both Co and Al; and a second composition optionally of $Li_{1+c}M'_2O_{4+d}$ (Formula II) where $-0.1 \leq c \leq 0.3$ and $-0.2 \leq d \leq 0.2$, wherein M' comprises Mn at about 75 at % to about 100 at %, wherein the second composition or a portion thereof optionally has a polyhedral morphology; the second composition within, on or about a surface of, or intermixed with said first composition.

26 Claims, 9 Drawing Sheets

(51) Int. Cl.
*H01M 4/525* (2010.01)
*H01M 4/58* (2010.01)
*H01M 4/583* (2010.01)
*H01M 4/02* (2006.01)

(52) U.S. Cl.
CPC ......... *H01M 4/5825* (2013.01); *H01M 4/583* (2013.01); *H01M 2004/021* (2013.01); *H01M 2004/027* (2013.01)

(56) References Cited

U.S. PATENT DOCUMENTS

| | | | |
|---|---|---|---|
| 5,645,077 | A | 7/1997 | Foxlin |
| 6,071,649 | A | 6/2000 | Mao et al. |
| 6,691,437 | B1 | 2/2004 | Yost |
| 6,723,757 | B1 | 4/2004 | Kerres et al. |
| 6,896,011 | B2 | 5/2005 | Talamona |
| 6,921,609 | B2 | 7/2005 | Lampe-Onnerud et al. |
| 6,936,365 | B2 | 8/2005 | Hobson et al. |
| 7,381,496 | B2 | 6/2008 | Onnerud et al. |
| 7,576,165 | B2 | 8/2009 | Li et al. |
| 8,532,899 | B1 | 9/2013 | Loomis |
| 8,566,034 | B1 | 10/2013 | Loomis |
| 8,768,621 | B2 | 7/2014 | Ruizenaar |
| 8,790,827 | B2 | 7/2014 | Yanagihara et al. |
| 8,896,301 | B2 | 11/2014 | Oka |
| 9,209,455 | B2 | 12/2015 | Ofer et al. |
| 9,391,317 | B2 | 7/2016 | Ofer et al. |
| 9,417,091 | B2 | 8/2016 | Troni-Peralta |
| 9,568,321 | B2 | 2/2017 | Bharadwaj et al. |
| 9,911,518 | B2 | 3/2018 | Kameyama et al. |
| 10,501,335 | B1 | 12/2019 | Pullen et al. |
| 10,700,386 | B2 | 6/2020 | Ofer et al. |
| 10,793,445 | B2 | 10/2020 | Pullen et al. |
| 10,843,936 | B2 | 11/2020 | Pullen et al. |
| 10,950,857 | B2 | 3/2021 | Pullen et al. |
| 11,158,853 | B2 | 10/2021 | Pullen et al. |
| 11,424,449 | B2 | 8/2022 | Rempel et al. |
| 11,682,762 | B2 | 6/2023 | Sriramulu et al. |
| 2005/0181280 | A1 | 8/2005 | Ceder et al. |
| 2005/0188128 | A1 | 8/2005 | Koshiba |
| 2006/0156810 | A1 | 7/2006 | Brett et al. |
| 2008/0046214 | A1 | 2/2008 | Fowler |
| 2008/0131782 | A1 | 6/2008 | Hagiwara et al. |
| 2009/0104530 | A1 | 4/2009 | Shizuka et al. |
| 2009/0121179 | A1 | 5/2009 | Shi |
| 2009/0309793 | A1 | 12/2009 | Loomis |
| 2010/0145620 | A1 | 6/2010 | Georgi |
| 2011/0033750 | A1 | 2/2011 | Hosokawa et al. |
| 2011/0077891 | A1 | 3/2011 | Koenig |
| 2011/0143209 | A1 | 6/2011 | Park |
| 2012/0009474 | A1 | 1/2012 | Yanagihara et al. |
| 2012/0028134 | A1 | 2/2012 | Kim et al. |
| 2012/0226395 | A1 | 9/2012 | Revol |
| 2012/0321948 | A1 | 12/2012 | Oya |
| 2013/0080112 | A1 | 3/2013 | Friend |
| 2013/0304375 | A1 | 11/2013 | Lee et al. |
| 2014/0197357 | A1 | 7/2014 | Ofer et al. |
| 2014/0278191 | A1 | 9/2014 | Anderson |
| 2014/0302615 | A1 | 10/2014 | Park et al. |
| 2014/0352400 | A1 | 12/2014 | Barrilado |
| 2015/0019266 | A1 | 1/2015 | Stempora |
| 2015/0079471 | A1 | 3/2015 | Fang et al. |
| 2015/0188134 | A1 | 7/2015 | Kameyama et al. |
| 2015/0188136 | A1 | 7/2015 | Mori et al. |
| 2015/0276975 | A1 | 10/2015 | Carroll |
| 2016/0013475 | A1* | 1/2016 | Ofer ............. H01M 4/364 252/182.1 |
| 2016/0041300 | A1 | 2/2016 | Meyer |
| 2016/0172674 | A1 | 6/2016 | Oda et al. |
| 2016/0181611 | A1 | 6/2016 | Cho et al. |
| 2016/0254539 | A1 | 9/2016 | Kagei et al. |
| 2018/0013145 | A1 | 1/2018 | Choi et al. |
| 2018/0040889 | A1 | 2/2018 | Choi et al. |
| 2018/0040890 | A1 | 2/2018 | Choi et al. |
| 2018/0040891 | A1 | 2/2018 | Choi et al. |
| 2018/0040896 | A1 | 2/2018 | Choi et al. |
| 2018/0115022 | A1 | 4/2018 | Ofer et al. |
| 2018/0337401 | A1 | 11/2018 | Ni et al. |
| 2019/0355983 | A1 | 11/2019 | Zhang et al. |
| 2019/0356015 | A1 | 11/2019 | Zhang et al. |
| 2019/0372109 | A1 | 12/2019 | Moon et al. |

FOREIGN PATENT DOCUMENTS

| | | |
|---|---|---|
| CN | 107591519 A | 1/2018 |
| CN | 109216651 | 1/2019 |
| EP | 2023426 A1 | 2/2009 |
| EP | 3306713 A1 | 4/2018 |
| JP | 2000030693 | 1/2000 |
| JP | 2000-340226 A | 12/2000 |
| JP | 2002-246041 | 8/2002 |
| JP | 2003059489 A | 2/2003 |
| JP | 2004253169 A | 9/2004 |
| JP | 2008234872 A | 10/2008 |
| JP | 2010047466 A | 3/2010 |
| JP | 2010-267408 | 11/2010 |
| JP | 5002872 | 8/2012 |
| JP | 5002872 B2 | 8/2012 |
| JP | 2014-220232 A | 11/2014 |
| JP | 2015213038 A | 11/2015 |
| JP | 5971109 | 8/2016 |
| JP | 2017105709 | 6/2017 |
| KR | 10-0206170 | 7/1999 |
| KR | 20020013887 | 2/2002 |
| KR | 1020100099668 | 9/2010 |
| KR | 10-2016-0074236 A | 6/2016 |
| KR | 20190003110 A | 1/2019 |
| WO | 2002103824 | 12/2002 |
| WO | 2005114768 | 12/2005 |
| WO | WO2008/02851 | 8/2008 |
| WO | 2013/025328 A2 | 2/2013 |
| WO | WO2014084138 | 6/2014 |
| WO | WO2015053357 | 4/2015 |
| WO | WO2017/189887 | 11/2017 |

OTHER PUBLICATIONS

Zuo, et al., Journal of Alloys and compounds, 2017; vol. 706, pp. 24-40.
Kim, H. et al., A New Coating Method for Alleviating Surface Degradation of LiNi0.6Co0.2Mn0.2O2 Cathode Material: Nanoscale Surface Treatment of Primary Particles, Nano Letters, 15: 2111-2119, 2015.
Moses, et al., Applied Surface Science, 2007; vol. 253, No. 10, pp. 4782-4791.
Li, et al., Journal of Alloys and Compounds, 2008; vol. 457, pp. L1-L5.
Lin, et al., Nature Communications, 2014; vol. 5, No. 3529, pp. 1-9.
Kim, et al., Energy Environ. Sci., 2018; vol. 11, pp. 1449-1459.
Lee, et al., Journal of Power Sources, 2015; vol. 273, pp. 663-669.
Jo, et al., Nano Research, 2015; vol. 8, No. 5, pp. 1464-1479.
Zheng, et al., Microstructural Changes in LiNi0.8Co0.15Al0.05O2 Positive Electrode Material during the First Cycle, Journal of The Electrochemical Society, 158: A357-A362, 2011.
Wantanabe, et al., Journal of Power Sources; vol. 258, pp. 210-217.
Kim, et al., Electrochemical and Solid State Letters, 2006; vol. 9, No. 1, pp. A19-A23.
Yan, et al., Nature Communications, 2017; vol. 8, No. 14101, pp. 1-9.
Kim, et al., Journal of Power Sources, 2006; vol. 159, pp. 1328-1333.
Kim, H. et al., Enhancing Interfacial Bonding between Anisotropically Oriented Grains Using a Glue-Nanofiller for Advanced Li-Ion Battery Cathode, Advanced Materials, 28: 4705-4712, 2016.
Lee, K., Electrochemical and Structural Characterization of Li-Ni1_i, CovO2 (0 < y < 0.2) Positive Electrodes during Initial Cycling, Journal of the Electrochemical Society, 145(5): 1709-1717, 2000.
Yang, et al., Journal of Power sources, 2016; vol. 331, pp. 487-494.

(56) References Cited

OTHER PUBLICATIONS

Yoon, M., et al., Reactive boride infusion stabilizes Ni-rich cathodes for lithium-ion batteries, Nature Energy, 6(4):362-371, 2021.

Sui, T. et al., Nanoscale chemical mapping of Li-ion battery cathode material by FIB-SEM and TOF-SIMS multi-modal microscopy, Nano Energy, 17: 254-260, 2015.

Huang, L. et al., Nickel-Cobalt Hydroxide Nanosheets Coated on NiCo2O4 Nanowires Grown on Carbon Fiber Paper for High-Performance Pseudocapacitors, Nano Letters, 13(7): 3135-3139, 2013.

Zhu, J. et al., Crystal Growth of Li[Ni1/3Co1/3Mn1/3]O2 as a Cathode Material for High-Performance Lithium Ion Batteries, Crystal Growth & Design, 12(3): 1118-1123, 2012.

Tian, J. et al., High-Rate and Cycling-Stable Nickel-Rich Cathode Materials with Enhanced Li+ Diffusion Pathway, ACE Applied Materials & Interfaces, 8(1): 582-587, 2015.

Wang, et al., Electron microscopic characterization of electrochemically cycled LiCoO2 and Li(Al, Co)O2 battery cathodes, Journal of Power Sources, 81-82: 594-598, 1999.

Makimura, Y. et al., Microstructural Observation of LiNi0.8Co0.5Al0.05O2 after Charge and Discharge by Scanning Transmission Electron Microscopy, Journal of The Electrochemical Society, 159(7): A1070-A1073, 2012.

Li, J. et al., Addressing cation mixing in layered structured cathodes for lithium-ion batteries: A critical review, Nano Materials Science, pp. 1-17, Sep. 2022.

Yan, P. et al., Tailoring grain boundary structures and chemistry of Ni-rich layered cathodes for enhanced cycle stability of lithium-ion batteries, Nature Energy, 3: 600-605, Jul. 2018.

\* cited by examiner

MULTIPLE MORPHOLOGY COMPOSITE CATHODE MATERIALS PROVIDING HIGH ENERGY AND LONG CYCLE LIFE AND CELLS EMPLOYING THE SAME

FIELD

Disclosed are metal oxides forming a composite material with multiple morphologies and demonstrating improved cycle life and excellent specific energy, methods of manufacture thereof, and articles including the same.

BACKGROUND

The majority of current lithium ion batteries include one of two main types of cathode materials. The first are layered metal oxides having a rhombohedral layered $\alpha$-NaFeO$_2$ type structure (R-3M space group) with general formula LiMO$_2$ (M=usually a combination of Ni, Co, Mn, Al). To achieve high capacity, these cathodes contain a large percentage of Ni which is stabilized with Co and small amounts of other elements. Unfortunately, both Ni and Co are expensive with the latter also having environmental and supply issues. The second are olivine-type Lithium Iron Phosphate (LFP) materials. The LFP materials have an orthorhombic structure with Pmma space group (Y. Ikuhara, Nano Lett, 2016; 16: 5409-5414). LFP cathodes are considerably less expensive than LMO$_2$ cathodes; however, they also have much lower capacity (~150 mAh/g as opposed to >200 mAh/g for LMO$_2$ cathodes) and lower average discharge voltage (3.4V vs. Li as opposed to 3.8V vs. Li for LMO$_2$ cathodes). Importantly, since iron is highly detrimental to layered metal oxide cathodes, the two cathode types cannot be produced in the same plant environment making it difficult for cathode suppliers producing LMO$_2$ cathode materials to also produce LFP cathodes without great expense.

A third cathode type, Mn-rich cathodes, are of high interest due to relatively low cost (reduced use of Co and Ni), high capacity, environmental friendliness, and high thermal stability. Mn-rich cathodes, often called layered-layered cathodes, often have the chemical formula xLi$_2$MnO$_3$·(1-x) LiMO$_2$. The structure is a solid solution of an octahedral layered oxide (LiMO$_2$) and a monoclinic oxide (Li$_2$MnO$_3$). While Mn-rich cathodes can be processed in the same facilities as LiMO$_2$ cathodes making them desirable for a replacement for LPF based devices, unfortunately, these cathodes have poor rate capability and serious voltage fade.

As such, new cathode materials are needed that combine high capacity retention and low cost, and can be manufactured using existing lithium ion cathode facilities.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are composite materials that may, but need not necessarily, be used as an electrochemically active material in a cathode of an electrochemical cell, optionally lithium ion electrochemical cell. The composite materials as provided herein when used in a lithium ion cell demonstrate improved cycle life with capacity similar to NMC622 and greatly improved over LFP, yet have manufacturing costs similar to LFP due to the presence of lower amounts of Ni and concentrating more expensive elements in the grain boundary thereby reducing overall Co amounts when used. Thus, the composite materials as provided herein have excellent performance at greatly reduced cost.

A composite material as provided herein optionally includes a first composition comprising Li$_{1+a}$MO$_{2+b}$ (Formula I) where $-0.3 \leq a \leq 0.3$ and $-0.3 \leq b \leq 1.3$ and where M comprises 20 at % to 80 at % Mn and 30 at % to 75 at % Ni, said first composition formed of a polycrystalline morphology comprising a plurality of crystallites and a grain boundary between adjacent crystallites, said grain boundary comprising one or more enrichment elements in at least a portion thereof, said one or more enrichment elements present at a higher atomic percentage in said portion than in an adjacent crystallite, wherein said one or more enrichment elements is selected from the group consisting of Co, Al, or both Co and Al; and a second composition comprising Li$_{1+c}$M'$_2$O$_{4+d}$ (Formula II) where $-0.1 \leq c \leq 0.3$ and $-0.2 \leq d \leq 0.2$, wherein M' comprises Mn at about 75 at % to about 100 at %, wherein said second composition or a portion thereof comprises a polyhedral morphology; said second composition within, on or about a surface of, or intermixed with said first composition. In the composite material the second composition may include a faceted polyhedral morphology. In some aspects, the second composition comprises epitaxial growth marks, striation marks, or both. The second composition may have a spinel-type crystal structure. The particle size of the second composition is optionally smaller than the first composition with the second composition optionally having a particle size of about 0.1 µm to about 3 µm. The second material is optionally present in the overall composite material at about 1 wt % to about 15 wt % of said composite material. In any of the foregoing materials, M in the first composition optionally comprises Ni, Mn and Co and M' in the second composition optionally comprises Mn and Ni. In the second composition, M' optionally comprises Ni at greater than from about 0 at % to about 25 at % of M', and Mn comprises about 75 at % to about 100 at % of M'. Optionally, Ni in M' is present at about 5 at % to about 20 at %. Optionally, M comprises Ni present at about 10 at % or greater or total M, optionally about 30 at % or greater, optionally about 10 at % to about 75 at %, and M further comprises Mn at about 45 at % to about 65 at % of total M. Optionally, M further comprises Co, optionally at greater than about 0 at % to about 15 at %, optionally about 0.01 at % to about 10 at %. In some aspects, M comprises Mn at about 30 at % to about 80 at %, Ni at about 0 to about 75 at %, 0 to about 15 at % Co, and/or 0 to about 5 at % Mg, or any combination thereof. In some aspects of the composite material as provided herein, M comprises about 30 at % to about 80 at % Mn, about 30 at % to about 75 at % Ni, about 0 to about 15 at % Co, and about 0 at % to about 5 at % Mg. Optionally, a composite material as provided herein is grain boundary enriched in the first composition where the enrichment element is optionally Co, Al, or both Co and Al.

Also provided are processes of making any of the foregoing composite materials. Also provided are electrodes that may optionally be used as cathodes including any of the foregoing composite materials. Also provided are electrochemical cells that may optionally include the composite materials in cathodes.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings.

DETAILED DESCRIPTION

Figure 1:
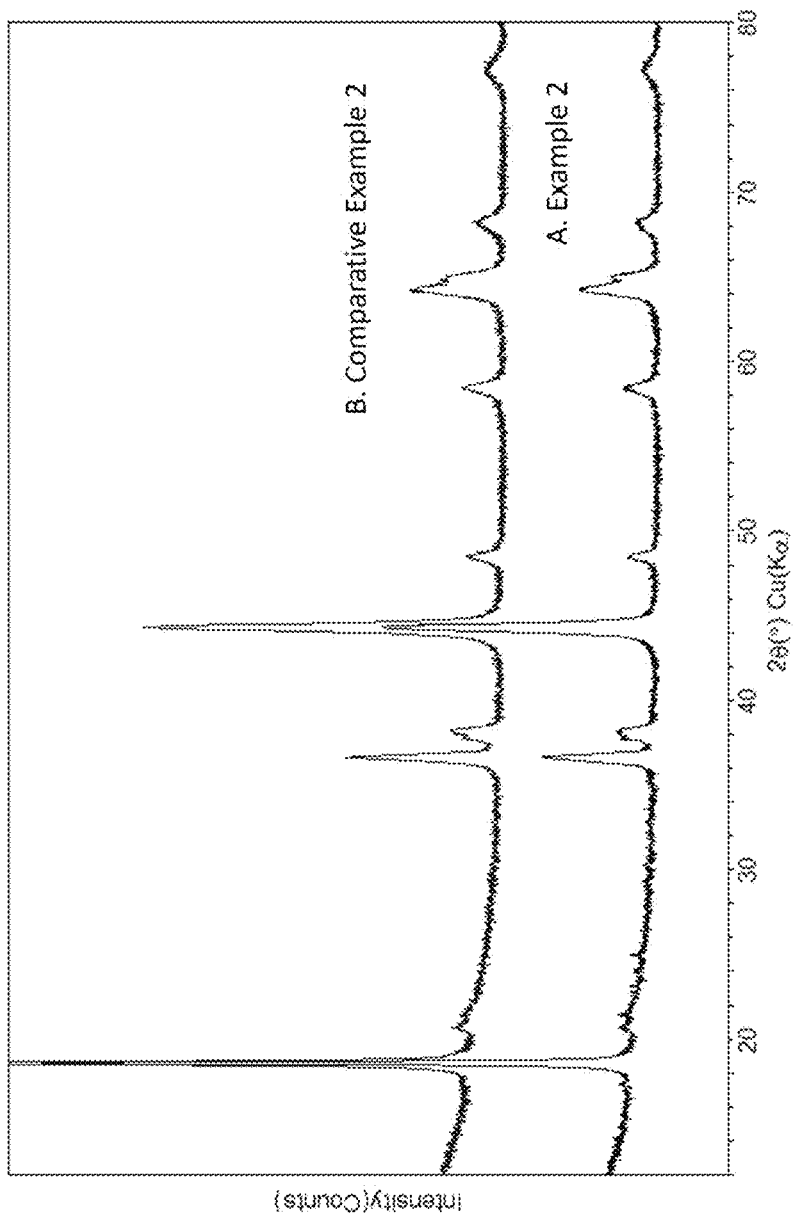
FIG. 1 illustrates XRD patterns for cathode materials A. Example 2 and B. Comparative Example 2 illustrating similar patterns.

Provided are electrochemically active composite materials that may be used as actives in electrochemical cells, optionally batteries. It was found that by tailoring synthesis techniques in materials designed to include high levels of Mn, multiple morphology composite materials with greatly improved cycle life and capacity could be produced. These multiple morphology materials do not suffer the capacity fade and rate capability issues observed with prior Mn-rich cathode materials. In addition, these multiple morphology Mn-containing electrochemically active materials are dramatically superior to commercially available LFP cathode materials and have greater capacity than NMC622 cathode material which is the most prevalent on the market. Further, unlike LFP cathodes, the composite materials as provided herein are also amenable to manufacture using existing LMO$_2$ material manufacturing facilities. The ability of these materials to discharge to higher voltages leads to a higher energy dense material that may lead to reduced weight batteries and packs.

Provided are materials that may be used in electrochemical cells, optionally secondary cells, optionally lithium ion secondary cells, optionally in a cathode, the cathode including an electrochemically active composite material comprising a first composition including Mn and characterized by a polycrystalline morphology; and a second composition also including Mn, wherein said second composition or a portion thereof is characterized by a polyhedral morphology, wherein the second composition is within, on or about a surface of, or intermixed with the first composition. A first composition may be a polycrystalline morphology material, and a second composition may be a polyhedral morphology.

As used herein, an "electrochemically active" material is one that includes one or more structures that are able to reversibly intercalate a cation, optionally a lithium cation.

The electrochemically active composite materials of this present disclosure may include a component therein that is or resembles LiMO$_2$-type material. Materials of the LiMO$_2$ type are typically dense, polycrystalline formations of primary crystals. These are typically made using standard solid-state processes at temperatures in the range of 600° C. to 900° C. starting from a variety of precursor materials. Precursor materials are typically transition metal hydroxides or sulfides, lithium precursors (e.g., LiOH or Li$_2$CO$_3$), or inorganic precursors for other dopants (e.g., hydroxides, carbonates, nitrates).

During heating of a precursor mixed metal hydroxide mixture of high Mn materials, it was found that polycrystalline LiMO$_2$ and Li$_2$MnO$_3$ are typically formed along with the expulsion of gases such as H$_2$O, CO$_2$ or NO$_2$. Surprisingly, it was further found that by tailoring the way the mixed metal hydroxide precursor materials are generated in a precipitation reaction, optionally without changing the overall composition of the resulting material, a multiple morphology composite material could be produced that had superior cycle and capacity characteristics. The result of the sintering action under the right conditions and with the proper precursors is the formation of a first composition that has the morphology of a plurality of primary crystallites that collectively form the larger secondary particle (polycrystalline) that may serve as the electrochemically active material and a second composition that has a substantially polyhedral, optionally soft polyhedral, optionally single crystal morphology, with the second composition often localizing to the surface of the first composition secondary particle.

It is known that the regions between the primary crystallites in polycrystalline materials, the grain boundaries, can be selectively enriched with Co as is found in U.S. Pat. No. 9,209,455. In the present disclosure, the inventors have found that significant further improvements can be achieved by replacing some of the elements in the bulk material with relatively high, but tailored levels of Mn and producing the particles in such a way that a multiple morphology composite material is formed. Unexpectedly, when the composite material as provided herein is formed, improved cycle life and power capabilities may be achieved, addressing the shortcomings of prior Mn-rich materials and NMC622.

Accordingly, this disclosure provides improved electrochemically active composite materials such as those suitable for use in a positive electrode (cathode) for a Li-ion secondary cell that, relative to prior high Mn-rich materials, improve cycle life or rate capability. Also, provided are a variety of methods for achieving the composite materials and electrochemical cells that employ such materials in an electrode.

An electrochemically active composite material as provided herein includes two or more compositions that differ in structural morphology. A first composition is of a polycrystalline morphology, and a second composition is of a substantially polyhedral morphology. The second composition may be located within, on or about a surface of, or intermixed with the first composition.

In some aspects, a second composition is located on a surface of a first composition, optionally in physical contact with the surface of the first composition. A second composition is appreciated to be of different morphology and optionally different elemental makeup relative to a first composition, but optionally localized in contact with a first composition as is the result of synthetic procedures as provided herein. In some aspects, a second composition penetrates a surface of a first composition and is therefore about a first composition, optionally existing within the three dimensional structure of the surface of a first composition but at the surface thereof. Optionally, a second composition is localized within a first composition as a distinct region within a portion of a first composition. In some aspects, a second composition is intermixed with a first composition, optionally, but not necessarily in direct physical contact with a first composition. It is appreciated that in some aspects, each of the foregoing arrangements of the first and second compositions need not necessarily be exclusive of each other, meaning that multiple localization regions or types may be observed within the same material. Optionally, a second composition is located on a surface of a first composition and about a surface of a first composition. Optionally, a second composition may be on a surface of a first composition and be intermixed with a first composition. Optionally, a second composition may be on or about a first composition and be within a first composition or portion thereof.

A second composition has a morphology that differs from a morphology of a first composition. A second composition may be a single crystal morphology meaning that a second composition may not be polycrystalline. Optionally, a second composition may be a single crystal. The overall morphology of the second composition may be polyhedral, optionally soft polyhedral. A polyhedral morphology is a three dimensional shape with one more substantially flat sides in the form of a polyhedron. Optionally, one or more sides is substantially in the shape of a polyhedron with three or more edges, optionally, 3, 4, 5, 6, 7, 8, 9, 10, or more edges. As such, a morphology of a second composition may include one or more substantially flat sides that may form an octahedron, truncated octahedron, twinned elongated square pyramid, square ring structure, or other. In some aspects, a polyhedral morphology may be a soft polyhedral morphology, meaning that the one or more sides need not necessarily be perfectly flat, or an edge may not be perfectly linear thereby creating a morphology that resembles a polyhedron, but is not necessarily of perfect polyhedral shape. Optionally, all sides or edges of a second composition need not be identical to other sides or edges with some sides or edges having a curved shape or morphology. A second composition, however, is not a polycrystalline morphology material.

A second composition is optionally of a faceted morphology, optionally a faceted polyhedral morphology. A faceted polyhedral morphology is a morphology characterized by the presence of one or more facets or polyhedrons of different shape or number of sides intermixed with primary polyhedron shapes.

A second composition optionally has a spinel-type crystal structure. A spinel-type crystal structure is generally represented by $A[B_2]O_4$ where A and B may be the same or different elements. Optionally, an A element is Li. Optionally, a B element is a transition metal, optionally Ni, Mn, Co, Al, or a combination thereof. Thus, in the crystal structure, the A and B elements occupy the octahedral and tetrahedral sites in the crystal lattice and the oxygen forms the overall close-packed lattice.

In some aspects, a second composition includes one more epitaxial growth marks, striation marks, or both. An epitaxial growth mark resembles the look of growth in layers with each mark defining a separate layer of material. Epitaxial growth marks need not result from actual epitaxial growth, but leave an overall morphology that resembles such growth. Striation marks appear as a plurality of lines of substantially parallel or parallel curved nature and are observed on or near the surface of a second composition. In some aspects, a second composition includes both epitaxial growth marks and striation marks.

A first composition and a second composition may each independently be in the form of a particle. The particles of the second composition have a particle size, optionally an overall average particle size of a plurality of particles of second composition. A particle size or average particle size of a second composition measured as an average edge to edge dimension passing substantially through a center of a particle is optionally of a size of about 0.1 micrometers (μm) to about 3 μm, or any value or range therebetween, optionally 0.5 micrometers (μm) to about 3 μm, or any value or range therebetween. Optionally, a particle size or average particle size is 0.1 μm, optionally 0.2 μm, optionally 0.3 μm, optionally 0.4 μm, optionally 0.5 μm, optionally 0.6 μm, optionally 0.7 μm, optionally 0.8 μm, optionally 0.9 μm, optionally 1.0 μm, optionally 1.25 μm, optionally 1.5 μm, optionally 1.75 μm, optionally 2.0 μm, optionally 2.25 μm, optionally 2.5 μm, optionally 2.75 μm, optionally 3.0 μm.

A first composition has a first composition particle size defined as the size of a secondary particle measured from outside edge to opposing outside edge and passing substantially through a center of the first composition particle. A particle size or average particle size (overall average of all particles of the same composition) of a first composition is optionally from about 1 μm to about 25 μm, or any value or range therebetween. Optionally, a first composition has a particle size or average particle size of about 1 μm, optionally about 2 μm, optionally 3 μm, optionally about 4 μm, optionally 5 μm, optionally about 6 μm, optionally 7 μm, optionally about 8 μm, optionally 9 μm, optionally about 10 μm, optionally 11 μm, optionally about 12 μm, optionally 13 μm, optionally about 14 μm, optionally 15 μm, optionally about 16 μm, optionally 17 μm, optionally about 18 μm, optionally 19 μm, optionally about 20 μm, optionally 21 μm, optionally about 22 μm, optionally 23 μm, optionally about 24 μm, optionally 25 μm. Optionally, a particle size or average particle size of a first composition is from about 1 μm to about 15 μm, optionally about 1 μm to about 10 μm.

The second composition is optionally present at a molar or weight abundance relative to a first composition. A first composition is optionally present at a greater molar or weight abundance relative to a second composition. A second composition is optionally present at about 1 weight percent (wt %) to about 15 wt % of the total of the composite material. Optionally, the second composition is present at 1 wt % to 10 wt %, optionally 2 wt % to 10 wt %. In some aspects, a second composition is present at about 1 wt % of the composite material, optionally about 1.5 wt %, optionally about 2 wt %, optionally about 2.5 wt %, optionally about 3 wt %, optionally about 3.5 wt %, optionally about 4 wt %, optionally about 4.5 wt %, optionally about 5 wt %, optionally about 5.5 wt %, optionally about 6 wt %, optionally about 6.5 wt %, optionally about 7 wt %, optionally about 7.5 wt %, optionally about 8 wt %, optionally about 8.5 wt %, optionally about 9 wt %, optionally about 9.5 wt %, optionally about 10 wt %, optionally about 10.5 wt %, optionally about 11 wt %, optionally about 11.5 wt %, optionally about 12 wt %, optionally about 12.5 wt %, optionally about 13 wt %, optionally about 13.5 wt %, optionally about 14 wt %, optionally about 14.5 wt %, optionally about 15 wt %.

The electrochemically active composite materials as provided herein include a first composition that is a polycrystalline material formed of a plurality of nanometer (nm) size crystallites each comprising a first formulation, optionally of a LiMO type. A length, a width, and a thickness of the crystallite may be selected independently, and each of the length, width, and thickness of the crystallite may be about 5 to about 1000 nanometers (nm), specifically about 10 to about 900 nm, more specifically about 20 to about 800 nm. The first composition formed of a plurality of crystallites may be referred to as a secondary particle. The particles as provided herein are uniquely tailored to have grain boundaries between the primary crystallites. Grain boundaries are formed during the process of sintering a precursor particle when the precursor particle is formed of the proper components and sintered under the appropriate conditions. It was further found that by selectively enriching these grain boundaries with one or more enrichment elements subsequent to grain boundary formation, such as with Co or Al as examples, particles are produced that provide for improved performance and cycle life of a cell incorporating the particles as a component of a cathode.

Such grain boundary-enriched Mn-containing materials may be readily manufactured by calcining a green body formulation including a LiOH and a precursor Mn-containing hydroxide or carbonate to form particles with defined grain boundaries and then enriching the grain boundaries with one or more enrichment elements such as Co or a combination of Co and Al, among others, such that the resulting particles have more of the grain boundary-enriching element than prior to enrichment and optionally greater than within the crystallites, the outer surfaces of which abut the edges of the grain boundaries in the secondary particle.

The first composition particles are appreciated to include between adjacent of the particles of a first composition a grain boundary formed of or including a second elemental formulation, wherein a concentration of an enrichment element, for example, in at least a portion of the grain boundary is greater than a concentration of the enrichment element, for example, in the primary crystallite(s) adjacent thereto as measured by atomic percentage of the enrichment element relative to metals in each composition. The concentration of the enrichment element in the grain boundary containing such enrichment element is optionally greater than the enrichment element concentration within the adjacent crystallite(s) on average. The materials as provided herein are optionally relatively uniform in enrichment element within the crystallites. Whether uniform or not, the concentration of an enrichment element in the grain boundary is greater than the concentration of the enrichment element, individually or combined, as averaged within crystallite adjacent to the region of a grain boundary. Optionally, the provided first composition include a further outer coating layer may be disposed on an outer surface of the secondary particle to provide a coated secondary particle.

As provided herein, a second composition includes Mn. Optionally, a second composition includes Ni and Mn. Optionally, a second composition is an oxide such as a metal oxide or mixed metal oxide. Optionally, a second composition is a lithiated metal oxide or mixed metal oxide. Also as provided herein, a first composition includes Mn. Optionally, a first composition includes Ni and Mn. Optionally, a first composition is an oxide such as a metal oxide or mixed metal oxide. Optionally, a first composition is a lithiated metal oxide or mixed metal oxide.

In some aspects of the presently provided composite material, the first composition is a polycrystalline layered-structure lithiated metal oxide defined by composition $Li_{1+a}MO_{2+b}$ (Formula I) and optionally a cell or battery formed therefrom, where $-0.3 \le a \le 0.3$ and $-0.3 \le b \le 1.3$. In some aspects, a is −0.1, optionally −0.2, optionally −0.3, optionally 0, optionally 0.1, optionally 0.2, or optionally 0.3. Optionally, a is greater than or equal to −0.3, −0.2. −0.10, −0.09, −0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30. In some aspects, b is −0.3, optionally −0.2, optionally −0.1, optionally 0, optionally 0.1, optionally 0.2, optionally 0.3, or optionally about 1.0. Optionally, b is greater than or equal to −0.30, −0.29, −0.28, −0.27, −0.26, −0.25, −0.24, −0.23, −0.22, −0.21, −0.20, −0.19, −0.18, −0.17, −0.16, −0.15, −0.14, −0.13, −0.12, −0.11, −0.10, −0.09, −0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.40, 0.50, 0.60, 0.70, 0.80, 0.90, 1.0, 1.1, 1.2, or 1.3. Optionally, $-0.3 \le a \le 0.3$ and $-0.3 \le b \le 0.4$.

It is appreciated that in some aspects Li in Formula I need not be exclusively Li, but may be partially substituted with one or more elements selected from the group consisting of Mg, Sr, Na, K, and Ca. The one or more elements substituting Li, are optionally present at 10 atomic % or less, optionally 5 atomic % or less, optionally 3 atomic % or less, optionally no greater than 2 atomic percent, where percent is relative to total Li in an otherwise equivalent non-substituted material.

In the first composition in Formula I, M includes Mn optionally at a tailored concentration. Mn is optionally present at about 20 at % to about 80 at % relative to the total M, optionally about 20 at % to about 64 at %, or any value or range therebetween, or higher than 80 at %, optionally higher than 65 at %. Thus, when Mn is present at 30 at % to 80 at % and much more enhanced at 35 at % to 65 at % or 45 at % to 65 at %, combined with grain boundary enrichment with one or more enrichment elements as also provided herein, optionally Co or Al, dramatic improvements in cycle life and/or rate capability are achieved relative to non-grain boundary enriched materials. As such, the materials of Formula I as provided herein as a first composition, optionally further including grain boundary enrichment, optionally include about 20 at % to about 80 at % Mn of the total M in Formula I, optionally about 35 at % to about 65 at % Mn, optionally about 45 at % to about 65 at % Mn. Optionally, Mn is present in M at or greater than 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63 or 64 at % and equal to or less than 80, 79, 78, 77, 76, 75, 74, 73, 72, 71, 70, 69, 68, 67, 66, or 65 at %. Optionally, Mn is present in M at or between 45 at % to 65 at %, optionally 40 at % to 70 at %, optionally, 35 at % to 74 at %, optionally 35 at % to 80 at %, optionally 35 at % to 65 at %, optionally 35 at % to 70 at %.

M in Formula 1 as provided in the first composition optionally includes Ni. The amount of Ni in the first composition is optionally from about 10 atomic percent to about 75 atomic percent (at %) of total M, optionally from about 30 at % to about 75 at % of total M. Optionally, the Ni component is equal to or less than 75 at %, optionally 50 at %. Optionally, the Ni component is less than or equal to 40 at %. Optionally, the Ni component is less than or equal to 30 at %. Optionally, the Ni component is less than or equal to 20 at %. Optionally, the Ni component is less than or equal to 10 at %. Optionally, the Ni component of M is less than or equal to 75, 70, 65, 60, 55, 50, 45, 40, 35, 30, 25, 20, 15, 10, 5, 4, 3, or 2 at %. In some aspects Ni is absent.

In some aspects, M in Formula I of the first composition is Mn with Ni alone, or Ni or Co or both in combination optionally with one or more additional elements, or Mn in combination optionally with one or more additional elements. The additional elements are optionally metals. Optionally, an additional element may include or be one or more of Al, Mg, Co, Mn, Ca, Sr, Zn, Ti, Y, Cr, Mo, Fe, V, Si, Ga, or B. In some aspects, the additional element may include Mg, Co, Al, or a combination thereof. Optionally, the additional element may be Mg, Al, V, Ti, B, or a combination thereof. Optionally, the additional element is selected from the group consisting of Mg, Al, V, Ti, or B. Optionally, the additional element selected from the group consisting of Co, and Al. Optionally, the additional element selected from the group consisting of Ca, Co, and Al. Optionally, the additional element is Co.

An additional element in Formula I of the first composition may be present in an amount of about 1 to about 69 at %, specifically about 5 to about 70 at %, more specifically about 10 to about 70 at % of M in the first composition. Optionally, the additional element may be present in an amount of about 1 to about 20 at %, specifically about 2 to about 18 at %, more specifically about 4 to about 16 at %, of M in the first composition. In some illustrative examples, M is about 30-75 at % Ni, 0-15 at % Co, 30-80 at % Mn, and 0-10 at % additional elements. In some illustrative examples, M is about 30-50 at % Ni, 0.01-10 at % Co, 30-80 at % Mn, and 0-10 at % additional elements. Optionally, M comprises about 30 at % to about 80 at % Mn, about 0 to about 50 at % Ni, about 0 to about 15 at % Co, and about 0 at % to about 5 at % Mg. It is appreciated that the at % of total M equals 100.

Within the polycrystalline first material, each crystallite may have any suitable shape, which can be the same or different within each particle. Further, the shape of each crystallite can be the same or different in different particles. Because of its crystalline nature, the crystallite may be faceted, the crystallite may have a plurality of flat surfaces, and a shape of the crystallite may approximate a geometric shape. In some aspects, the crystallite may be directly adjacent with neighboring crystallites with mismatched crystal planes. The crystallite may optionally be a polyhedron. The crystallite may have a rectilinear shape, and when viewed in cross-section, a portion of or an entirety of the crystallite may be rectilinear. The crystallite may be square, hexagonal, rectangular, triangular, or a combination thereof.

In some aspects, the first composition portion forming the crystallites in part or in whole optionally has the layered α-NaFeO$_2$-type structure, a cubic structure, a spinel structure, or a combination thereof.

In particular aspects, an electrochemically active composite material has an enriched grain boundary, optionally where the atomic percentage of one or more enrichment elements in the grain boundary is higher than the atomic percentage of the same element(s) in the adjacent crystallites, optionally as averaged throughout the crystallites as a whole and/or the adjacent crystallites. A grain boundary may be as described in U.S. Pat. Nos. 9,391,317 and 9,209,455 with the exception that enrichment elements as described herein may each be independently enriched in the grain boundary relative to their concentrations in the adjacent crystallites where they are combined with the tailored amount of Mn as provided herein.

In some aspects, the first composition portion forming the grain boundary in part or in whole optionally has the layered α-NaFeO$_2$-type structure, a cubic structure, a spinel structure, or a combination thereof. As noted above, a concentration of one or more enrichment elements in the grain boundaries may be greater than a concentration of the one or more enrichment elements in the crystallites. An aspect in which the grain boundaries have the layered α-NaFeO$_2$-type structure is specifically mentioned. Another aspect in which the grain boundaries with α-NaFeO$_2$-type structure with defects is specifically mentioned. Another aspect in which parts of the grain boundaries have a cubic or spinel structure is specifically mentioned.

More specifically, the Mn-rich LiMnO materials as provided herein are optionally consistent with a LiMO$_2$ structure with R-3M space group. In some aspects, the crystallites, grain boundary or both include a mix of phases also including a Li$_2$MnO$_3$ monoclinic structure. Thus, in some aspects, the materials as provided herein are optionally a heterogeneous mix of phase structures. In some aspects, a material as provided herein includes a grain boundary with a predominant of LiMO$_2$ structure with R-3M space group, optionally a grain boundary entirely with a LiMO$_2$ structure with R-3M space group. In some aspects, a material as provided herein includes a plurality of crystallites with a predominant of LiMO$_2$ structure with R-3M space group, optionally a plurality of crystallites entirely with a LiMO$_2$ structure with R-3M space group. In some aspects, the grain boundary, crystallites or both includes a mix of LiMO$_2$ structure and Li$_2$MO$_3$ structure. Optionally, a Li$_2$MO$_3$ structure is a layered-layered Li$_2$MO$_3$—LiMO$_2$ structure.

The grain boundaries optionally include lithiated metal oxides defined by composition Li$_{1+a}$M"O$_{2+b}$ (Formula III) where $-0.3 \le a \le 0.3$ and $-0.3 \le b \le 1.3$. In some aspects, a is $-0.1$, optionally $-0.2$, optionally $-0.3$, optionally 0, optionally 0.1, optionally 0.2, or optionally 0.3. Optionally, a is greater than or equal to $-0.3$, $-0.2$, $-0.10$, $-0.09$, $-0.08$, $-0.07$, $-0.06$, $-0.05$, $-0.04$, $-0.03$, $-0.02$, $-0.01$, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30. In some aspects, b is $-0.3$, optionally $-0.2$, optionally $-0.1$, optionally 0, optionally 0.1, optionally 0.2, optionally 0.3, or optionally about 1.0. Optionally, b is greater than or equal to $-0.30$, $-0.29$, $-0.28$, $-0.27$, $-0.26$, $-0.25$, $-0.24$, $-0.23$, $-0.22$, $-0.21$, $-0.20$, $-0.19$, $-0.18$, $-0.17$, $-0.16$, $-0.15$, $-0.14$, $-0.13$, $-0.12$, $-0.11$, $-0.10$, $-0.09$, $-0.08$, $-0.07$, $-0.06$, $-0.05$, $-0.04$, $-0.03$, $-0.02$, $-0.01$, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.40, 0.50, 0.60, 0.70, 0.80, 0.90, 1.0, 1.1, 1.2, or 1.3.

In Formula III, M" optionally includes Mn at a tailored concentration. Mn is optionally present at 30 at % to 80 at % relative to the total M", or any value or range therebetween. The materials of Formula III as provided herein optionally include 30 at % to 80 at % Mn of the total M" in Formula III, optionally 35 at % to 65 at % Mn. Optionally, Mn is present in M" at or greater than 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63 or 64 at % and equal to or less than 80, 79, 78, 77, 76, 75, 74, 73, 72, 71, 70, 69, 68, 67, 66, or 65 at %. Optionally, Mn is present in M" at or between 45 at % to 65 at %, optionally 40 at % to 70 at %, optionally, 35 at % to 74 at %, optionally 35 at % to 80 at %, optionally 35 at % to 65 at %, optionally 35 at % to 70 at %. In some aspects, M" excludes Ni or Mn, or both Ni and Mn. Optionally, M" excludes all metal elements other than an enrichment element as provided herein. In some aspects, M" excludes all metals other than an enrichment element at some regions of the grain boundary, but includes one or more elements as found in M" in other regions of the grain boundary.

Examples of enrichment elements that can potentially be included in M" of Formula III to form grain boundary enriched secondary particles include a variety of elements that can substitute for Ni in the LiM"O$_2$ structure. If, for example, trivalent (3+) ions of doping elements that can directly substitute for Ni$^{3+}$ are less easily oxidized than the Ni ions when the material is charged, they will promote the beneficial cycling characteristics observed with the materials as described herein; substitution of Ni(III) by Al(III) is an example. If tetravalent (4+) ions substitute for Ni$^{3+}$, they are charge-compensated by Ni ions in the 2+ state and their inductive effects raise the potential for oxidation of those Ni ions to the 4+ state; substitution of Ni(III) by Mn(IV) is an example. Alternatively, if difficult-to-oxidize 2+ ions substitute for Ni, they are charge-compensated by Ni ions in the 4+ state; substitution of Ni(III) by Mg (II) is an example. In order to substitute for Ni in the LiM"O$_2$ structure, doping ions may be of size comparable to that of the Ni ions, and they may raise the local oxidation potential. The relative impact of a given ion's impact on the oxidation potential can often be estimated from its ionization energy relative to that of Ni$^{3+}$. Therefore, ions of size comparable to Ni$^{3+}$ and having comparable or higher ionization energy can potentially serve to stabilize oxidized first composition's grain boundaries. The following table provides the ionization energies and hexacoordinate (octahedral environment) ionic radii for examples of ions that might stabilize the grain boundaries of charged high-Ni LiMO$_2$ cathode materials.

TABLE 1

Oxidation potentials and ionic radii for elements*

| ion | ionization energy (kJ/mol) | ionic radius (angstroms) |
|---|---|---|
| Ni 2+ | 3395 | 0.69 |
| Ni 3+ | 5300 | 0.56-0.6 |
| Ni 4+ | 7339 | 0.48 |
| Co 3+ | 4950 | 0.545-0.61 |
| Co 4+ | 7670 | 0.53 |
| Al 3+ | 11577 | 0.535 |
| Mn 3+ | 4940 | 0.58-0.645 |
| Mn 4+ | 6990 | 0.53 |
| Mg 2+ | 7733 | 0.72 |

TABLE 1-continued

Oxidation potentials and ionic radii for elements*

| ion | ionization energy (kJ/mol) | ionic radius (angstroms) |
|---|---|---|
| Ti 4+ | 9581 | 0.605 |
| V 4+ | 6299 | 0.58 |
| Cr 3+ | 4743 | 0.615 |
| Cr 4+ | 6702 | 0.55 |
| Fe 3+ | 5290 | 0.55-0.645 |
| Fe 4+ | 7240 | 0.585 |
| Cu 2+ | 5536 | 0.73 |
| Cu 3+ | 7700 | 0.54 |
| Zn 2+ | 5731 | 0.74 |
| Ga 3+ | 6180 | 0.62 |
| Zr 4+ | 7752 | 0.72 |
| Mo4+ | 5257 | 0.65 |
| Sn 4+ | 7456 | 0.69 |
| Y 3+ | 5847 | 0.9 |
| Y 4+ | 7430 | <0.9 |

*ionization energy

As such, M" includes one or more enrichment elements that may be selected from a group that oxidize less than nickel when electrochemically charged to 4.3V or higher relative to Li metal anode. In one example, M" in the grain boundary can comprise Ni and a combination of Co and Mn, which oxidizes less than nickel when charged to 4.3V. In other aspects, M" in the grain boundary may include Ni, Mn and one or more elements selected from the group comprising Cr, Fe, Ti, V, Co, Cu, Zn, Zr, Nb, Sb, W, Sc, Al, Mo, Y, etc., which oxidize less than Ni when charged to 4.3V relative to lithium metal. Optionally, M" in the grain boundary excludes the combination of Ni with Co alone, Al alone, or a combination of Co and Al, and Co, Al, or both may be present with doping of one or more additional enrichment elements as provided herein. In some aspects, M" in the grain boundary may include an element selected from the group of elements that will not oxidize when charged to 4.3V relative to lithium such as Y, Sc, Ga, In, Tl, Si, Ge, Sn, Pb, etc.

M" optionally includes one or more enrichment elements, optionally Co, Al, or both, at a higher concentration than such element in the crystallites as described herein. M" in Formula III optionally includes Ni. The amount of Ni in M" is optionally from 10 atomic percent to 50 atomic percent (at %) of total M". Optionally, the Ni component is equal to or less than 50 at %. Optionally, the Ni component is less than or equal to 40 at %. Optionally, the Ni component is less than or equal to 30 at %. Optionally, the Ni component is less than or equal to 20 at %. Optionally, the Ni component is less than or equal to 10 at %. Optionally, the Ni component of M is less than or equal to 50, 45, 40, 35, 30, 25, 20, 15, 10, 5, 4, 3, or 2 at %. In some aspects Ni in M" is absent.

For the materials optionally as provided herein, the nominal or overall formulated composition of the first composition secondary particles (for example, characterized by elemental mapping form SEM), is defined by the general formula LiMO, wherein M is Mn and optionally one or more additional metals and including a grain boundary including one or more enrichment elements at an enriched concentration. As an example, the mole fraction of Co and/or Al, if present, as defines the composition of the crystallites, is lower than the mole fraction of the total Co and/or Al independently or combined in the total particle composition as determined by elemental mapping. The mole fraction of the enrichment element independently or combined in the crystallites can be zero. The mole fraction of the enrichment element in the grain boundary independently or combined is higher than the mole fraction of that enrichment element independently or combined in the total particle as measured by elemental mapping. It is noted that this is an example alone as the Co, Al, or both may be instead or in addition one or more other enrichment elements as illustrated herein.

A Formula III composition within the grain boundaries optionally includes Co or Al and/or one or more other enrichment elements, optionally with the condition that the concentration of Co or Al and/or one or more other enrichment elements independently or combined in the grain boundary is greater than the concentration of Co or Al and/or one or more other enrichment elements independently or combined in the crystallites, optionally where the concentration of Co in the grain boundary is greater than the concentration of Co in the crystallites, and optionally where the concentration of Al in the grain boundary is greater than the concentration of Al in the crystallites, or one or more other enrichment elements at a concentration in the grain boundary greater than the concentration of the one or more enrichment elements in the crystallites. As a non-limiting example, it was found that using processes that are capable of enriching an enrichment element in the grain boundaries, liquid solutions that included amounts relative to the total transition metal of the particle to be enriched of Co of at or between 0 at % and 8 at %, optionally at or between 3 at % and 5 at % Co could be supplemented with 0.01 at % to 10 at % Al, optionally 1.5 at % or less Al, relative to the total transition metal content of the particle to be enriched, where the added Co and Al are incorporated into the grain boundaries of the secondary particle.

The volume fraction of grain boundaries within a given secondary particle will vary because the primary particle size distribution varies with variations in overall composition and synthetic conditions, and accordingly, the final concentration of the one or more enrichment elements in the grain boundary can vary between different secondary particles and within individual secondary particles as well, while still always being greater than the concentrations of the one or more enrichment elements in the adjacent or total crystallites. It is thus most useful that the amount of an enrichment element added to the grain boundary be defined relative to the formulation of the crystallite. In some aspects, the amount of the one or more enrichment elements is similar to that described in U.S. Pat. No. 11,424,449 or U.S. Pat. No. 10,501,335, but in this disclosure the grain boundaries and crystallites also further include Mn at or about the tailored concentration as otherwise described herein.

Optionally, Li in the grain boundary need not be exclusively Li, but may be partially substituted with one or more Li-substitution elements selected from the group consisting of Mg, Sr, Na, K, and Ca. The one or more Li-substitution elements, are optionally present at 10 atomic % or less, optionally 5 atomic % or less, optionally 3 atomic % or less, optionally no greater than 2 atomic percent, where percent is relative to total Li in the as-made material.

In some aspects of the presently provided composite material, the second composition is a polyhedral morphology lithiated metal oxide defined by composition $Li_{1+c}M'_2O_{4+d}$ (Formula II) and optionally a cell or battery formed therefrom, where $-0.1 \leq c \leq 0.3$ and $-0.2 \leq d \leq 0.2$. In some aspects, c is −0.1, optionally 0, optionally 0.1, optionally 0.2, or optionally 0.3. Optionally, c is greater than or equal to −0.10, −0.09, −0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30. In some aspects, d is −0.2, optionally −0.1, optionally 0, optionally 0.1, optionally 0.2. Optionally, d is greater than or equal to −0.20, −0.19, −0.18, −0.17, −0.16, −0.15, −0.14, −0.13, −0.12, −0.11, −0.10, −0.09, −0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, or 0.20.

It is appreciated that in some aspects, Li in Formula II need not be exclusively Li, but may be partially substituted with one or more elements selected from the group consisting of Mg, Sr, Na, K, and Ca. The one or more elements substituting Li, are optionally present at 10 atomic % or less, optionally 5 atomic % or less, optionally 3 atomic % or less, optionally no greater than 2 atomic percent, where percent is relative to total Li in an otherwise equivalent non-substituted material.

In the second composition in Formula II, M' includes Mn optionally at a tailored concentration. Mn is optionally present at 75 at % to 100 at % relative to the total M', or any value or range therebetween. Thus, Mn is present in M' optionally at 75 at % to 95 at % and much more enhanced at 75 at % to 95 at %. Optionally, M' includes Mn 75 at % to 90 at % Mn of the total M' in Formula II, optionally 75 at % to 80 at % Mn. Optionally, Mn is present in M' at or greater than about 75, 76, 77, 78, 79, 80, 81, 82, 83, 84, 85, 86, 87, 88, 89, 90, 91, 92, 93, 94, 95, 96, 97, 98, or 99 at %.

M' in Formula II as provided in the second composition optionally includes Ni. The amount of Ni in the second composition is optionally from about 0 or >0 atomic percent to about 25 atomic percent (at %) of total M'. Optionally, Ni is present in M' at about 5 at % to about 20 at %. Optionally, the Ni component is equal to or less than about 20 at %. Optionally, the Ni component is less than or equal to about 15 at %. Optionally, the Ni component is less than or equal to about 10 at %. Optionally, the Ni component is less than or equal to about 5 at %. Optionally, the Ni component is less than or equal to about 1 at %. In some aspects Ni is absent in M'.

Optionally, M' in Formula II of the second composition is Mn with Ni alone, or Ni or Co, or both in combination optionally with one or more additional elements, or Mn in combination optionally with Ni and one or more additional elements. The additional elements are optionally metals. Optionally, an additional element may include or be one or more of Al, Mg, Co, Mn, Zn, Ti, Cr, Mo, V, or B. In some aspects, the additional element may include Mg, Co, Al, or a combination thereof. Optionally, the additional element may be Mg, Al, V, Ti, B, or a combination thereof. Optionally, the additional element is selected from the group consisting of Mg, Al, V, Ti, or B. Optionally, the additional element selected from the group consisting of Co, and Al. Optionally, the additional element selected from the group consisting of Ca, Co, and Al. Optionally, the additional element is Co.

An additional element in Formula II of the second composition may be present in an amount of about 0.1 to about 25 at %, specifically about 0.1 to about 10 at % of M' in the second composition. Optionally, the additional element may be present in an amount of about 1 to about 20 at %, specifically about 2 to about 18 at %, more specifically about 4 to about 16 at %, of M' in the second composition. In some illustrative examples, M' is about 30-50 at % Ni, 0-15 at % Co, 30-80 at % Mn, and 0-10 at % additional elements. In some illustrative examples, M' comprises Ni at from about 0 at % to about 25 at % of M', and Mn comprises about 75 at % to about 100 at % of M'.

An overall composite material as provided herein optionally has an elemental composition of $Li_aNi_xMn_yCo_zO_b$, wherein $1.18 \le a \le 1.4$, $0.3 \le x \le 0.6$, $0.45 \le y \le 0.65$, $0 \le z \le 0.07$, and $1.9 \le b \le 2.4$ wherein said overall elemental composition includes the total of both the first composition and the second composition.

The composite materials as provided herein may be prepared by synthesizing a green body from at least two components, optionally in powder form. At least two components may include micronized (or non-micronized) lithium hydroxide or its hydrate and a precursor hydroxide(s) comprising Mn and optionally one or more other elements, and where the precursor hydroxides are optionally obtained by co-precipitation processes. By tailoring the conditions under which the formation of the metal hydroxide is formed, one can then produce an electrochemically active composite material as provided herein. It was found that by using a co-precipitation process in a continuous reactor at relatively lower rates of metal addition to the reactor and making subtle changes to the amount of ammonia and/or to the pH, the mixed metal hydroxide resulting from the coprecipitation reaction can effectively be used to form a composite material that is a mix of a first composition with a polycrystalline morphology and a second composition with a polyhedral morphology and wherein the composite material has improved electrochemical properties.

A mixed metal hydroxide may be formed in a reactor. To the reactor a mixed metal sulfate solution is added. The mixed metal sulfate solution may be a mixture of desired amounts of metal sulfates such as but not limited to one or more of $NiSO_4$, $CoSO_4$, and $MnSO_4$ to produce the overall desired composition of the final material. The metal sulfates are mixed to form a mixed metal sulfate solution. This mixed metal sulfate solution is added to a reactor that is precharged with $NaSO_4$ and $NH_3OH$ in water and at a desired temperature, optionally about 60° C. To this precharged reactor, the mixed metal nitrate is added with simultaneous injecting of a desired amount of $NH_3OH$ and NaOH with stirring so as to maintain the pH and ammonia concentration of the reaction substantially constant throughout the precipitation reaction. The mixed metal hydroxide that is a mixture of the precursor metals from the precursor metal sulfate precipitates in the reaction is formed as a slurry that is pumped out of the reactor at a rate sufficient to keep the reactor volume substantially constant. This mixed metal hydroxide precursor may be filtered and dried for subsequent use in forming an electrochemically active composite material as provided herein.

It is appreciated that the final overall composition (although not necessarily distribution) of the elements in the composite material may be adjusted by increasing or decreasing the relative amounts of the precursor metal materials in the formation of the mixed metal hydroxide.

In some aspects, the precursor hydroxide may be a mixed metal hydroxide. In some aspects, the mixed metal hydroxide may include a metal composition of Mn alone or in combination with Ni and Co, Al, or a combination thereof, but such composition is exemplary only. Optionally, the mixed metal hydroxide includes as a metal component 30-80 at % Mn along with 0-60 at % Ni, 0-15 at % Co, and/or 0-5 at % Mg. Optionally the mixed metal hydroxide includes Ni from 20-50 at %, Co in the range of 0-10 at %, and Mn in the range of 30-80 at %. Optionally the mixed metal hydroxide includes Ni from 20-50 at %, Co in the range of 0-10 at %, Al in the range of 0-10 at %, and Mn in the range of 30-80 at %. Optionally the mixed metal hydroxide includes Ni from 20-70 at %, Co in the range of 0-7.5 at %, Al in the range of 2-8 at %, and Mn in the range of 30-80 at %. Optionally, the metals of the mixed metal hydroxide is about 39 at % Ni, about 55 at % Mn, and about 6 at % Co.

In some aspects, mixed metal hydroxide is lithiated with lithium hydroxide or its hydrate that is optionally micronized. The two or more powders forming the green body may be combined and shaken on a paint shaker to thoroughly mix the precursors. The green body is then calcined with a controlled air or pure oxygen atmosphere to a maximum temperature. Calcining is optionally preformed following a heating curve. The calcined product may then be processed to form a free-flowing powder.

An electrochemically active composite material may be formed by a multi-step process whereby a mixed metal hydroxide particle is formed and calcined in the presence of lithium so as to establish the formation of a polycrystalline precursor material that has a first composition with defined grain boundaries optionally with the primary particles (crystallites) having $\alpha$-$NaFeO_2$ structure with few defects. The particles are then subjected to a liquid process that applies one or more enrichment elements, optionally Co, Al, or a combination thereof, at the desired concentration levels followed by drying and then a heat treatment so as to move the enrichment element precipitated species at the surface selectively into the grain boundaries of the polycrystalline first composition to thereby form the polycrystalline first composition in the form of a secondary particle having a concentration of the enrichment element, optionally Co and/or Al, in the grain boundaries that is higher than in the crystallites. According to methods of manufacturing a secondary particle that has a base of Ni, Co, and Mn with high Mn levels as provided herein as an example, formation may include: combining a lithium compound, and the mixed metal hydroxide precursor compound of one or more metals or metalloids (e.g. Ni, Co, and Mn combined as previously generated such as by a co-precipitation reaction) to form a mixture; heat treating the mixture at about 30 to about 200° C. to form a dried mixture; heat treating the dried mixture at about 200 to about 500° C. for about 0.1 to about 5 hours; then heat treating at 600° C. to less than about 1000° C. for about 0.1 to about 14 hours to manufacture the secondary particle. A first calcination maximum temperature is relative and specific to the material used in the hydroxide precursor. Optionally, in a first calcination, a maximum temperature may be at or less than 950 degrees Celsius, optionally at or less than 900 degrees Celsius, optionally at or less than 850 degrees Celsius, optionally at or less than 800 degrees Celsius, optionally at or less than 750 degrees Celsius, optionally at or less than 720 degrees Celsius, optionally at or less than 715 degrees Celsius, optionally at or less than 710 degrees Celsius, optionally at or less than 705 degrees Celsius, optionally at or less than 700 degrees Celsius. Optionally, the maximum temperature of the first calcination may be about 1000 degrees Celsius or less. Optionally, the maximum temperature may be about 950 degrees Celsius or less. Optionally, the maximum temperature may be about 900 degrees Celsius or less. Optionally, the maximum temperature may be about 850 degrees Celsius or less. Optionally, the maximum temperature may be about 800 degrees Celsius or less. Optionally, the maximum temperature may be about 750 degrees Celsius or less. Optionally, the maximum temperature may be about 700 degrees Celsius or less. Optionally, the maximum temperature may be about 660 degrees Celsius or less. Optionally, the maximum temperature may be about 640 degrees Celsius or less. In yet other aspects, the maximum temperature may be less than about 700 degrees Celsius, about 695 degrees Celsius, about 690 degrees Celsius, about 685 degrees Celsius, about 680 degrees Celsius, about 675 degrees Celsius, about 670 degrees Celsius, about 665 degree Celsius, about 660 degrees Celsius, about 655 degrees Celsius, about 650 degrees Celsius, about 645 degrees Celsius, or about 640 degrees Celsius. The dwell time at the maximum temperature is optionally less than 14 hours. Optionally, the dwell time at the maximum temperature is less than or equal to 10 hours; optionally less than or equal to 7 hours; optionally less than or equal to 6 hours; optionally less than or equal to 5 hours; optionally less than or equal to 4 hours; optionally less than or equal to 3 hours; optionally less than or equal to 2 hours.

After calcination, subsequent processing may include breaking up the calcined material with a mortar and pestle so that the resulting powder passes through a desired sieve, optionally a #35 sieve. The powder is optionally then jar milled in a 1 gallon jar with a 2 cm drum YSZ media for optionally 5 minutes or an adequate time such that the material may pass through optionally a #270 sieve.

The product of the first calcination or milled product may be subsequently processed, optionally in a method so as to result in enriched grain boundaries of the first composition polycrystalline material following a second calcination. A process to enrich grain boundaries within a primary particle may be performed by methods or using compositions as illustrated in U.S. Pat. Nos. 9,391,317 and 9,209,455 with the exception that the application process uses a liquid solution that includes a level of enrichment element, optionally Co and/or a level of Al, but it is appreciated that other such enrichment elements as provided herein may be used. The grain-boundary-enriching elements may optionally be applied by suspending the milled product in an aqueous slurry comprising the one or more enrichment elements, and a lithium compound optionally at a temperature of about 60 degrees Celsius whereby the enrichment elements, optionally Co and/or Al, are present in the aqueous solution at the concentrations so as to selectively enrich grain boundaries as described herein. The slurry may then be spray dried to form a free-flowing powder which is then subjected to a second calcination optionally with a heating curve following a two ramp/dwell process. The first two ramp/dwell temperature profile may be from ambient (about 25 degree Celsius) to 450 degrees Celsius and optionally at a rate of 5 degree Celsius per minute with a 1 hour hold at 450 degrees Celsius. Subsequently, the second ramp/dwell may be from 450 degrees Celsius to a maximum temperature at a rate of 2 degrees Celsius per minute with a 2 hour hold at the maximum temperature. In some aspects, the maximum temperature is less than about 725 degrees Celsius, optionally at or about 700 degrees Celsius. In other aspects, the maximum temperature is about 700 degrees Celsius, optionally 750 degrees Celsius.

By combining a first calcination with a maximum temperature as described above with a process to apply grain-boundary-enriching elements followed by a second calcination also as described above, it was found that the resulting composite material with a tailored Mn concentration could be used in a cathode so as to produce significantly improved reductions in capacity fade and/or increases in rate capability. Such a combination was found to result in additional cycle life significantly improving the electrochemical performance of the material while simultaneously dramatically reducing the cost relative to prior high Ni and Co materials.

Also provided are electrodes that include as a component of or the sole electrochemically active material a composite material as described herein. A composite material as provided herein is optionally included as an active component of a cathode. A cathode optionally includes a composite material as provided herein as an active material, and may further include a conductive agent and/or a binder. The conductive agent may comprise any conductive agent that provides suitable properties and may be amorphous, crystalline, or a combination thereof. The conductive agent may include a carbon black, such as acetylene black or lamp black, a mesocarbon, graphite, graphene, carbon fiber, carbon nanotubes such as single wall carbon nanotubes or multi-wall carbon nanotubes, or a combination thereof. The binder may be any binder that provides suitable properties and may include polyvinylidene fluoride, a copolymer of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, polyethylene oxide, or a combination thereof, for example.

The cathode may be manufactured by combining the composite material as described herein, the conductive agent, and the binder in a suitable ratio, e.g., about 80 to about 98 weight percent of the composite material, about 1 to about 20 weight percent of the conductive agent, and about 1 to about 10 weight percent of the binder, based on a total weight of the composite material, the conductive agent, and the binder combined. The composite material, the conductive agent, and the binder may be suspended in a suitable solvent, such as N-methylpyrrolidinone, and disposed on a suitable substrate, such as aluminum foil, and dried in air. It is noted that the substrate and the solvent are presented for illustrative purposes alone. Other suitable substrates and solvents may be used or combined to form a cathode.

A cathode as provided herein when cycled with a MCMB 10-28 graphite anode, a polyolefin separator and an electrolyte of carbonate based battery grade in a 2025 coin cell optionally demonstrates a significantly reduced capacity fade relative to similar Mn-rich materials of otherwise identical overall elemental composition. The capacity measurement plotted against cycle number results in a curve with a defined slope. The capacity slope is lower when the composite material as described herein is used relative to compositionally identical materials, but without a second composition as provided herein. In some aspects, the capacity fade of cells is at or less than 10% for the first 200 cycles, optionally 5% or less over the first 100 cycles. In some aspects, the capacity fade of cells is at or less than 15% for the first 400 cycles, optionally 5% or less over the first 200 cycles.

Also provided are electrochemical cells that employ an electrochemically active composite material as provided herein as an active material in a cathode and paired to an appropriate anode. An electrochemical cell as provided herein optionally uses as an electrochemically active material particles as provided herein optionally having an initial discharge capacity of equal to or greater than about 110 mAh/g, optionally about 120 mAh/g, optionally about 130 mAh/g, optionally about 140 mAh/g, optionally about 150 mAh/g, optionally about 160 mAh/g, optionally about 170 mAh/g, optionally about 180 mAh/g, optionally about 190 mAh/g, optionally about 200 mAh/g, optionally about 210 mAh/g, optionally about 220 mAh/g, optionally about 230 mAh/g, optionally about 240 mAh/g, and optionally demonstrating capacity fade of cells is at or less than 10% for the first 200 cycles, optionally 5% or less over the first 100 cycles. In some aspects, the capacity fade of cells is at or less than 15% for the first 400 cycles, optionally 5% or less over the first 200 cycles.

Also disclosed is an electrochemical cell, such as a battery, comprising the cathode. The battery may be a lithium-ion battery, a lithium-polymer battery, or a lithium battery, for example. The battery may include a cathode, an anode, and a separator interposed between the cathode and the anode. The separator may be a microporous membrane, and may include a porous film including polypropylene, polyethylene, or a combination thereof, or may be a woven or non-woven material such a glass-fiber mat. The anode may include a coating on a current collector. The coating may include an anode active material optionally a suitable carbon, such as graphite, coke, a hard carbon, or a mesocarbon such as a mesocarbon microbead, for example. In other aspects, an anode active material may be an oxide of titanium optionally including a nanowire such as $TiO_2$—B nanowires as described by Armstrong, et al., Journal of Power Sources, 146, no. 1-2 (2005): 501-506. One illustrative example of an oxide of titanium is a lithium titanium oxide (LTO). The lithium titanium oxide may have a spinel type structure. An anode may include an anode electrochemically active material optionally of the formula $Li_{4+a}Ti_5O_{12+b}$ (IV) wherein $-0.3 \leq a \leq 3.3$, $-0.3 \leq b \leq 0.3$. In some aspects the lithium titanium oxide may be of the formula 3

$$Li_{4+y}Ti_5O_{12}, \quad (V)$$

wherein, $0 \leq y \leq 3$, $0.1 \leq y \leq 2.8$, or $0 \leq y \leq 2.6$.
Alternatively, the lithium titanium oxide may be of Formula VI.

$$Li_{3+z}Ti_{6-z}O_{12}, \quad (VI)$$

where in formula VI, $0 \leq z \leq 1$. Optionally $0 \leq z \leq 1$, $0.1 \leq z \leq 0.8$, or $0 \leq z \leq 0.5$. A combination of anode electrochemically active materials including at least one of the foregoing lithium titanium oxides may be used. In some aspects an anode electrochemically active material includes or is $Li_4Ti_5O_{12}$.

The anode current collector or the cathode current collector may be formed of Ti, Al, Cu, or the like for example. A current collector may be in the form of a foil, a perforated foil, a screen, or other suitable configuration. A current collector for a cathode may be in electrical contact with a composite material as provided herein. A current collector for an anode may be in electrical contact with an anode active materials provided herein.

The battery also includes an electrolyte that may contact the positive electrode (cathode), the negative electrode (anode), and the separator. The electrolyte may include an organic solvent and a lithium salt. The organic solvent may be a linear or cyclic carbonate. Representative organic solvents include ethylene carbonate, propylene carbonate, butylene carbonate, trifluoropropylene carbonate, γ-butyrolactone, sulfolane, 1,2-dimethoxyethane, 1,2-diethoxyethane, tetrahydrofuran, 3-methyl-1,3-dioxolane, methyl acetate, ethyl acetate, methylpropionate, ethylpropionate, dimethyl carbonate, diethyl carbonate, ethyl methyl carbonate, dipropyl carbonate, methylpropyl carbonate, propane sultone, Fluoroethylene carbonate diFluoroethylene carbonate, Lithium bis(oxalato)borate, Tris (trimethylsilyl)malonate, Tris (trimethlysilyl) phosphate, or a combination thereof. In another aspect the electrolyte is a polymer electrolyte.

Representative lithium salts useful in an electrolyte include but are not limited to $LiPF_6$, $LiBF_4$, $LiAsF_6$, $LiClO_4$, $LiCF_3SO_3$, $Li(CF_3SO_2)_2N$, $LiN(SO_2C_2F_5)_2$, $LiN(SO_2F)_2$, $LiSbF_6$, $LiC(CF_3SO_2)_3$, $LiC_4F_9SO_3$, and $LiAlCl_4$. The lithium salt may be dissolved in the organic solvent. A combination comprising at least one of the foregoing can be used. The concentration of the lithium salt can be 0.1 to 2.0M in the electrolyte.

In some aspects, the electrolyte may be a solid ceramic electrolyte.

An electrochemical cell includes a separator positioned between the anode and the cathode in the unit cell. The separator may be formed from a microporous membrane, optionally a porous film including a polyolefin such as polypropylene, polyethylene, or a combination thereof. In some aspects, a separator may further include a coating or micro-particulate reinforcing filler of a ceramic oxide material, optionally aluminum oxide. A high permeability separator with Gurley air permeability of less than 200 seconds per 100 cc may be chosen to provide the cell with high power capability.

The battery may have any suitable configuration or shape, and may be cylindrical or prismatic.

Various aspects of the present disclosure are illustrated by the following non-limiting examples. The examples are for illustrative purposes and are not a limitation on any practice of the present invention. It will be understood that variations and modifications can be made without departing from the spirit and scope of the invention.

EXAMPLES

Example 1

A material having the composition of $Ni_{0.40}Mn_{0.56}Co_{0.04}(OH)_2$ was made by first dissolving 4.2 kg $NiSO_4 \cdot 6H_2O$, 449 g $CoSO_4 \cdot 7H_2O$, and 3.8 kg of $MnSO_4 \cdot 7H_2O$ (all available from Barentz) into 17.2 liters of DI water, creating a 2M mixed-metal sulfate solution. To a 3 L reaction vessel, a charge solution containing 1.5 L DI water, 150 g $NaSO_4$ (Barentz), and 40 ml $NH_3OH$ (14 M) (Barentz) was added and stirred until a temperature of 60° C. was reached. At this point, the metal nitrate solution was injected to the reactor (~5 ml/min) along with $NH_3OH$ (14 M, ~0.15 ml/min) and NaOH (10 M, ~1 ml/min). The solution was stirred at 900 rpm using an over-head stirrer and the pH and ammonia concentration were respectively maintained at ~11.2 and 0.32 M, respectively, throughout the reaction. Product slurry containing $Ni_{0.40}Mn_{0.56}Co_{0.04}(OH)_2$ was continuously pumped out of the 3 L reactor to keep the reactor volume constant. The solution was filtered, placed into an alumina crucible, and dried at 120° C. overnight.

Comparison Example 1

A material having the composition of $Ni_{0.40}Mn_{0.56}Co_{0.04}(OH)_2$ was made by first dissolving 4.2 kg $NiSO_4 \cdot 6H_2O$, 449 g $CoSO_4 \cdot 7H_2O$, and 3.8 kg of $MnSO_4 \cdot 7H_2O$ (all available from Barentz) into 17.2 liters of DI water, creating a 2 M mixed-metal sulfate solution. To a 3 L reaction vessel, a charge solution containing 1.5 L DI water, 150 g $NaSO_4$ (Barentz), and 55 ml $NH_3OH$ (14 M) (Barentz) was added and stirred until a temperature of 60° C. was reached. At this point, the metal nitrate solution was injected to the reactor (~6 ml/min) along with NH$_3$OH (14 M, ~0.2 ml/min) and NaOH (10 M, ~2 ml/min). The solution was stirred at 900 rpm using an over-head stirrer and the pH and ammonia concentration were respectively maintained at ~11.4 and 0.3 M, respectively, throughout the reaction. Product slurry containing Ni$_{0.40}$Mn$_{0.56}$Co$_{0.04}$(OH)$_2$ was continuously pumped out of the 3 L reactor to keep the reactor volume constant. The solution was filtered, placed into an alumina crucible, and dried at 120° C. overnight.

Example 2: Synthesis of Battery Cathode Material

For the synthesis of high-Mn layered cathode, 29.64 g of LiOH (dehydrated and milled) and 94.85 g of Ni$_{0.40}$Mn$_{0.56}$Co$_{0.04}$(OH)$_2$ (Example 1) were added to a 500 ml jar and shaken. The mixture was placed into an alumina crucible and sintered. Sintering was performed by heating at a rate of about 5° C. per minute to about 450° C. and held at 450° C. for about two hours. The temperature was then raised at about 2° C. per minute to about 850° C. and held for about twelve hours with oxygen purge. The sample was then allowed to cool naturally. The resulting powder Li$_{1.2}$Ni$_{0.40}$Mn$_{0.56}$Co$_{0.04}$O$_{2+\delta}$ was sieved and stored. 6 as used in the examples is −0.3≤δ≤1.3.

To make the final cathode product, 5.48 g of cobalt nitrate, 1.06 g of Aluminum nitrate, and 0.86 g of Lithium Nitrate were added to 90 ml of 40° C. methanol, in a 600 ml freeze drying flask, and dissolved. To this stirring solution, 90 g of Li$_{1.2}$Ni$_{0.40}$Mn$_{0.56}$Co$_{0.04}$O$_{2+\delta}$ was added and stirred until evenly dispersed. The flask was almost submerged into a 40° C. water bath at 40° angle from normal, and attached to a rotary evaporator to remove the methanol. The rotary evaporator condenser was set to 2° C., 15 mmHg, and 30 rpm. A stir bar was left in the solution for agitation. Once dry, the powder was placed in an alumina crucible and sintered. Sintering was performed by heating at a rate of about 5° C. per minute to about 450° C. and held at temperature for about two hours. The temperature was then raised at about 2° C. per minute to about 700° C. and held for about two hours with air purge. The resulting Li$_{1.2}$Ni$_{0.39}$Mn$_{0.54}$Co$_{0.06}$Al$_{0.01}$O$_{2+\delta}$ was sieved through a #142 and #170 sieve and tested in electrochemical cells.

The example 2 material as synthesized above was cast into cathode electrodes. The material was first mixed with PVdF, conductive carbon, and NMP solvent to prepare an electrode slurry. The electrode slurry was coated on to aluminum foil using a doctor blade approach. The coated foil was dried at 130° C. to drive off the NMP leaving behind a coated electrode. The electrode was then pressed, punched, and assembled into coin cells with Li metal anode (half cells) or with graphite anode (full cells), and tested.

Comparison Example 2: Synthesis of Battery Cathode Material

For the synthesis of high-Mn layered cathode, 29.64 g of LiOH (dehydrated and milled) and 94.85 g of Ni$_{0.40}$Mn$_{0.56}$Co$_{0.04}$(OH)$_2$ (Comparative Example 1) were added to a 500 ml jar and shaken. The mixture was placed into an alumina crucible and sintered. Sintering was performed by heating at a rate of about 5° C. per minute to about 450° C. and held at 450° C. for about two hours. The temperature was then raised at about 2° C./min to about 850° C. and held for about twelve hours with oxygen purge. The sample was then allowed to cool naturally. The resulting sample Li$_{1.2}$Ni$_{0.40}$Mn$_{0.56}$Co$_{0.04}$O$_{2+\delta}$ was sieved and stored.

To make the final cathode product, 5.48 g of cobalt nitrate, 1.06 g of Aluminum nitrate, and 0.86 g of Lithium Nitrate were added to 90 ml of 40° C. methanol, in a 600 ml freeze drying flask, and dissolved. To this stirring solution, 90 g of Li$_{1.2}$Ni$_{0.40}$Mn$_{0.56}$Co$_{0.04}$O$_{2+\delta}$ was added and stirred until evenly dispersed. The flask was almost submerged into a 40° C. water bath, at 40° angle from normal, and attached to a rotary evaporator to remove the methanol. The rotary evaporator condenser was set to 2° C., 15 mmHg, and 30 rpm. A stir bar was left in the solution for agitation. Once dry the powder was placed in an alumina crucible and sintered. Sintering was performed by heating at a rate of about 5° C. per minute to about 450° C. and held at temperature for about two hours. The temperature was then raised at about 2° C./min to about 700° C. and held for about two hours with air purge. The resulting Li$_{1.2}$Ni$_{0.39}$Mn$_{0.54}$Co$_{0.06}$Al$_{0.01}$O$_{2+\delta}$ was sieved through a #142 and #270 sieve and tested in electrochemical cells.

The cathode material of Example 2 and Comparative example 2 were subjected to analyses by x-ray diffraction (XRD). The results are illustrated in FIG. 1 demonstrating similar patterns for both materials.

Figure 2:
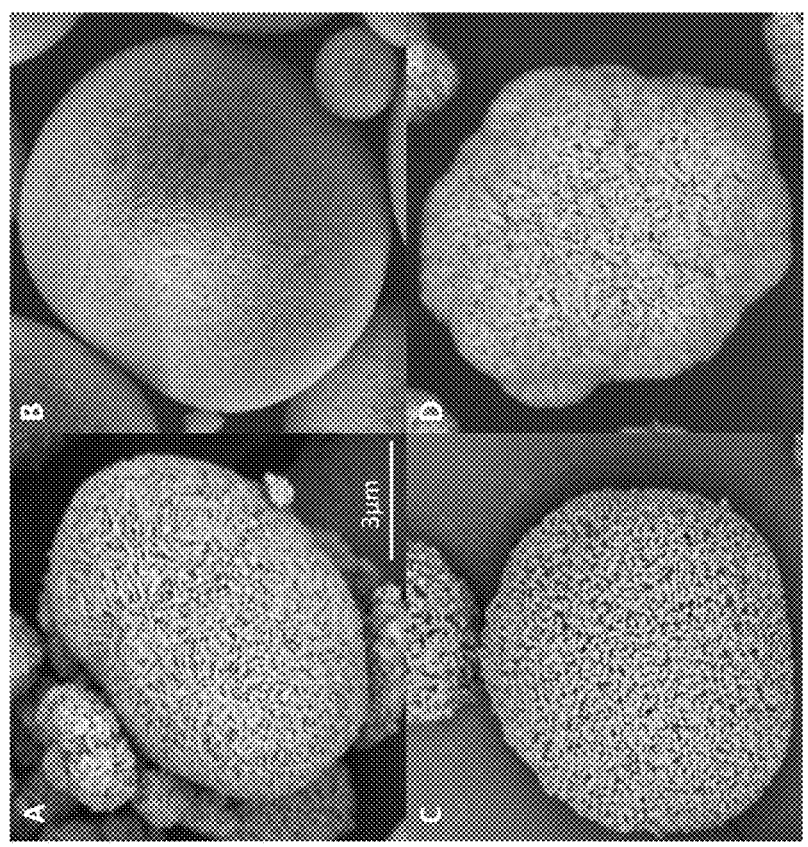
FIG. 2 illustrates SEM images of A. Example 1, B. Comparative Example 1, C. Example 2, D. Comparative Example 2. Small particles (<500 nm) can be seen on the surface of A & C. The surface of B & D is clean of small particles. The presence of these small particle secondary phases leads to a cathode material with superior performance. Scale bar for all samples is 3 μm.

The materials of Example 1, Comparative Example 1, Example 2, and Comparative Example 2 were analyzed by scanning electron microscopy (SEM). Results are illustrated in FIG. 2. There in the materials of Example 1 and Example 2, small particles of less than 500 nm in diameter are observed on the surface of the larger particles. The images of the material of Comparative Example 1 and Comparative Example 2 do not illustrate the presence of the small second material particles.

Figure 3:
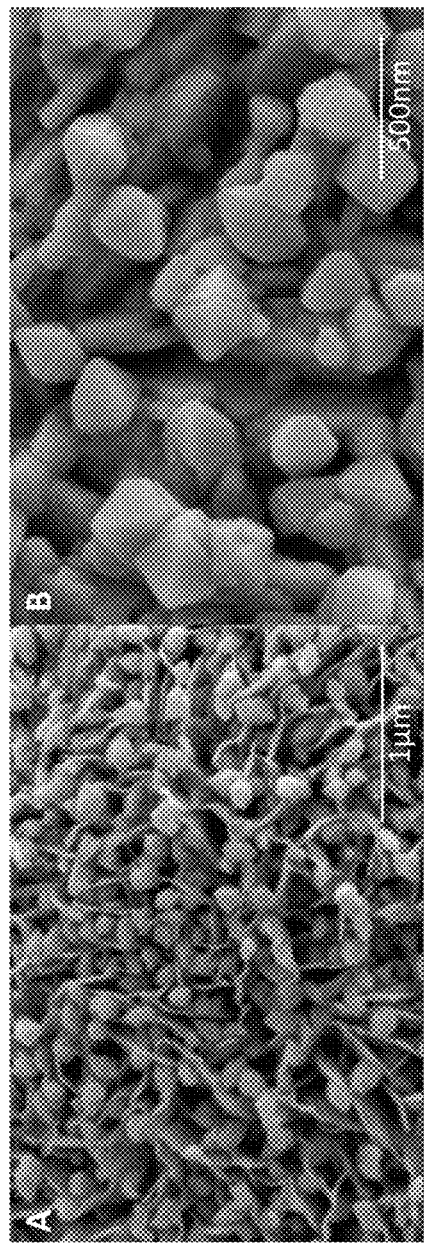
FIG. 3 illustrates SEM images of A. close-up of polyhedral part on the surface of Example 1. B. close-up of polyhedral part on the surface of Example 2.
Figure 4:
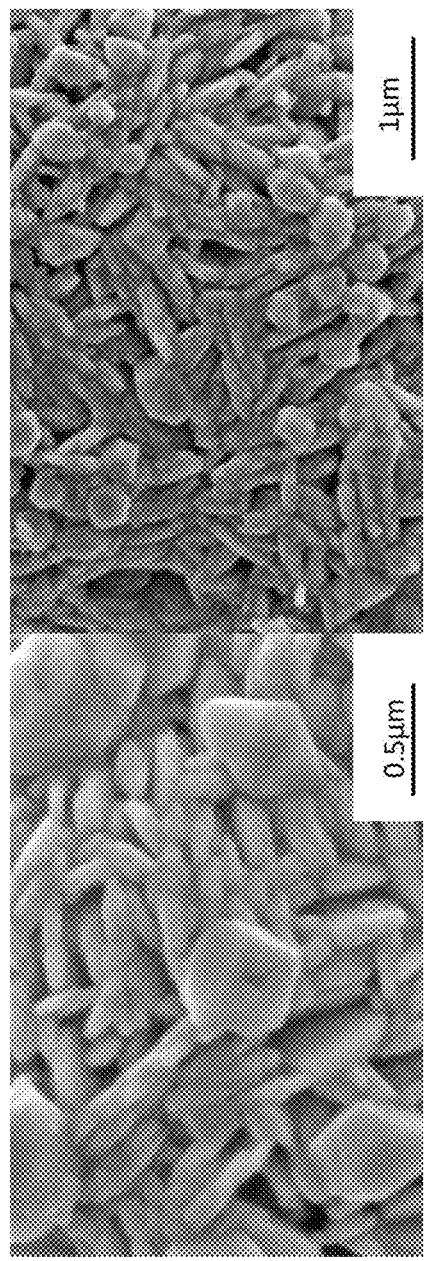
FIG. 4 illustrates SEM images showing the polyhedral phase does not have to be highly faceted.

FIG. 3 is a close up SEM image of the materials of Example 1 (A) and Example 2 (B). Both materials show the presence of secondary compositions with a polyhedral morphology with some of the secondary composition structures showing epitaxial growth marks or striation marks. FIG. 4 is SEM of similarly formed materials showing that the polyhedral morphology of the second composition need not be highly faceted and may be instead soft faceted.

The comparative example 2 material as synthesized above was cast into cathode electrodes. The material was first mixed with PVdF, conductive carbon, and NMP solvent to prepare an electrode slurry. The electrode slurry was coated on to aluminum foil using a doctor blade approach. The coated foil was dried at 130° C. to drive off the NMP leaving behind a coated electrode. The electrode was then pressed, punched, and assembled into coin cells with Li metal anode (half cells) or with graphite anode (full cells), and tested.

Figure 5:
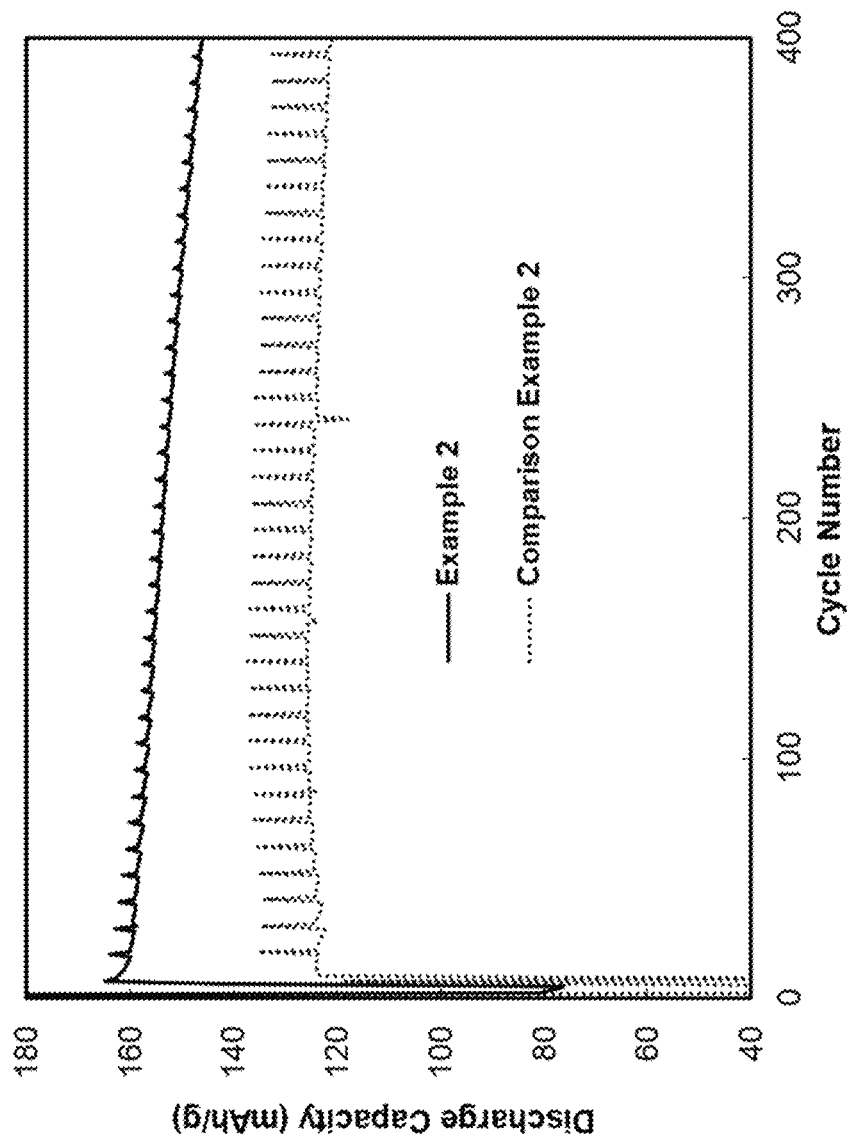
FIG. 5 illustrates full coin cell cycling data for Example 2 (solid line) and Comparison Example 2 (dashed line). Data is shown for full cells with graphite anode (~2 mAh/cm$^2$ cathode loading) cycled at 45° C. from 2.7-4.2 V under a rapid aging test protocol with average C-rate>1. Averaged data from coin cells are shown. Discharge capacity is normalized to mass of active cathode material.

The material of Example 2 and Comparative Example 2 were subjected to cycling in full cells vs. a graphite anode. The cells had a loading of the electrochemically active materials at ~2 mAh/cm$^2$ and were cycled at 45° C. from 2.7-4.2 V under a rapid aging test protocol with average C-rate>1. Results are illustrated in FIG. 5 with discharge capacity normalized to the mass of the active cathode material. The material of Example 2 has dramatically higher discharge capacity despite nearly identical overall composition demonstrating that that presence of multiple morphology materials as described herein leads to improved performance.

Example 3

A material having the composition of Ni$_{0.40}$Mn$_{0.56}$Co$_{0.04}$(OH)$_2$ was made by first dissolving 4.2 kg NiSO$_4$·6H$_2$O, 449 g CoSO$_4$·7H$_2$O, and 3.8 kg of MnSO$_4$·7H$_2$O (all available from Barentz) into 17.2 liters of DI water, creating a 2 M mixed-metal sulfate solution. To a 3 L reaction vessel, a charge solution containing 1.5 L DI water, 150 g NaSO$_4$ (Barentz), and 40 ml NH$_3$OH (14M) (Barentz) was added and stirred until a temperature of 60° C. was reached. At this point, the metal nitrate solution was added to the reactor (~7 ml/min) along with NH$_3$OH (14 M, ~0.25 ml/min) and NaOH (10 M, ~2 ml/min). The solution was stirred at 900 rpm using an over-head stirrer and the pH & ammonia concentration were respectively maintained at ~11.2 and 0.35 M respectively throughout the reaction. Product slurry containing Ni$_{0.40}$Mn$_{0.56}$Co$_{0.04}$(OH)$_2$ was continuously pumped out of the 3 L reactor to keep the reactor volume constant. The solution was filtered, placed into an alumina crucible, and dried at 120° C. overnight.

94.85 g of the resulting powder (Ni$_{0.40}$Mn$_{0.56}$Co$_{0.04}$(OH)$_2$) was added along with 32.66 grams (g) of LiOH (dehydrated and milled) to a 500 ml jar and shaken. The mixture was placed into an alumina crucible and sintered. Sintering was performed by heating at a rate of about 5° C. per minute to about 450° C. and held at 450° C. for about two hours. The temperature was then raised at about 2° C./min to about 850° C. and held for about twelve hours with oxygen purge. The sample was then allowed to cool naturally. The resulting Li$_{1.3}$Ni$_{0.40}$Mn$_{0.56}$Co$_{0.04}$O$_{2+\delta}$ powder was sieved and stored.

To make the final cathode product, 5.48 g of cobalt nitrate, 1.06 g of Aluminum nitrate, and 0.86 g of Lithium Nitrate were added to 90 ml of 40° C. methanol in a 600 ml freeze drying flask, and dissolved. To this stirring solution, 90 g of Li$_{1.3}$Ni$_{0.40}$Mn$_{0.56}$Co$_{0.04}$O$_{2+\delta}$ was added and stirred until evenly dispersed. The flask was almost submerged into a 40° C. water bath at 40° angle from normal, and attached to a rotary evaporator to remove the methanol. The rotary evaporator condenser was set to 2° C., 15 mmHg, and 30 rpm. A stir bar was left in the solution for agitation. Once dry, the powder was placed in an alumina crucible and sintered. Sintering was performed by heating at a rate of about 5° C. per minute to about 450° C. and held at temperature for about two hours. The temperature was then raised at about 2° C./min to about 700° C. and held for about two hours with air purge. The resulting Li$_{1.3}$Ni$_{0.37}$Mn$_{0.56}$Co$_{0.06}$Al$_{0.01}$O$_{2+\delta}$ was sieved through a #142 and #170 sieve and tested in electrochemical cells.

The material as synthesized above was cast into cathode electrodes. The material was first mixed with PVdF, conductive carbon, and NMP solvent to prepare an electrode slurry. The electrode slurry was coated on to aluminum foil using a doctor blade approach. The coated foil was dried at 130° C. to drive off the NMP leaving behind a coated electrode. The electrode was then pressed, punched, and assembled into coin cells with Li metal anode (half cells) or with graphite anode (full cells), and tested.

Comparison Example 3

Li$_1$Ni$_{0.6}$Mn$_{0.2}$Co$_{0.2}$O$_2$(NMC 622) cathode was purchased from Targray. The as-received material was cast into cathode electrodes. The material was first mixed with PVdF, conductive carbon, and NMP solvent to prepare an electrode slurry. The electrode slurry was coated on to aluminum foil using a doctor blade approach. The coated foil was dried at 130° C. to drive off the NMP leaving behind a coated electrode. The electrode was then pressed, punched, and assembled into coin cells with Li metal anode (half cells) or with graphite anode (full cells), and tested.

Comparison Example 4

LiFePO$_4$ (LFP) cathode was purchased from Targray. The as-received material was cast into cathode electrodes. The material was first mixed with PVdF, conductive carbon, and NMP solvent to prepare an electrode slurry. The electrode slurry was coated on to aluminum foil using a doctor blade approach. The coated foil was dried at 130° C. to drive off the NMP leaving behind a coated electrode. The electrode was then pressed, punched, and assembled into coin cells with Li metal anode (half cells) or with graphite anode (full cells), and tested.

Figure 6:
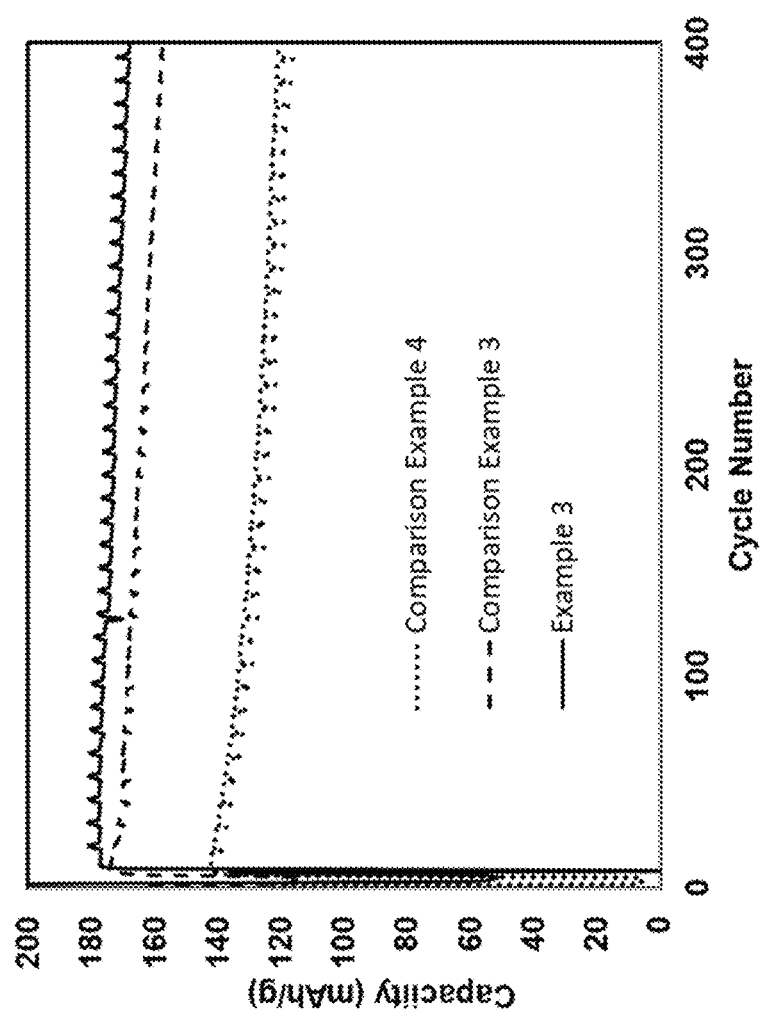
FIG. 6 illustrates full coin cell cycling data for Example 3 (solid line), Comparison Example 3 (dashed line) and Comparison Example 4 (dotted line). Data is shown for full cells with graphite anode (~2 mAh/cm$^2$ cathode loading) cycled at 45° C. from 2.7-4.2 V under a rapid aging test protocol with average C-rate>1. Averaged data from coin cells are shown. Discharge capacity is normalized to mass of active cathode material.

FIG. 6 illustrates the cycling performance of the composite material of Example 3 with the NMC622 (Comparative Example 3) and LFP (Comparative Example 4). Data in FIG. 6 is shown for full cells with graphite anode (~2 mAh/cm$^2$ cathode loading) cycled at 45° C. from 2.7-4.2 V under a rapid aging test protocol with average C-rate>1. Averaged data from coin cells are shown. Discharge capacity is normalized to mass of active cathode material. As is readily observed in FIG. 6, the composite material of Example 3 has modestly improved performance over the standard material of NMC622 demonstrating that the composite material with high Mn levels performs as well if not better than NMC622. Compared to LFP, the composite materials of Example 3 show greatly improved capacity and cycle life.

Figure 8:
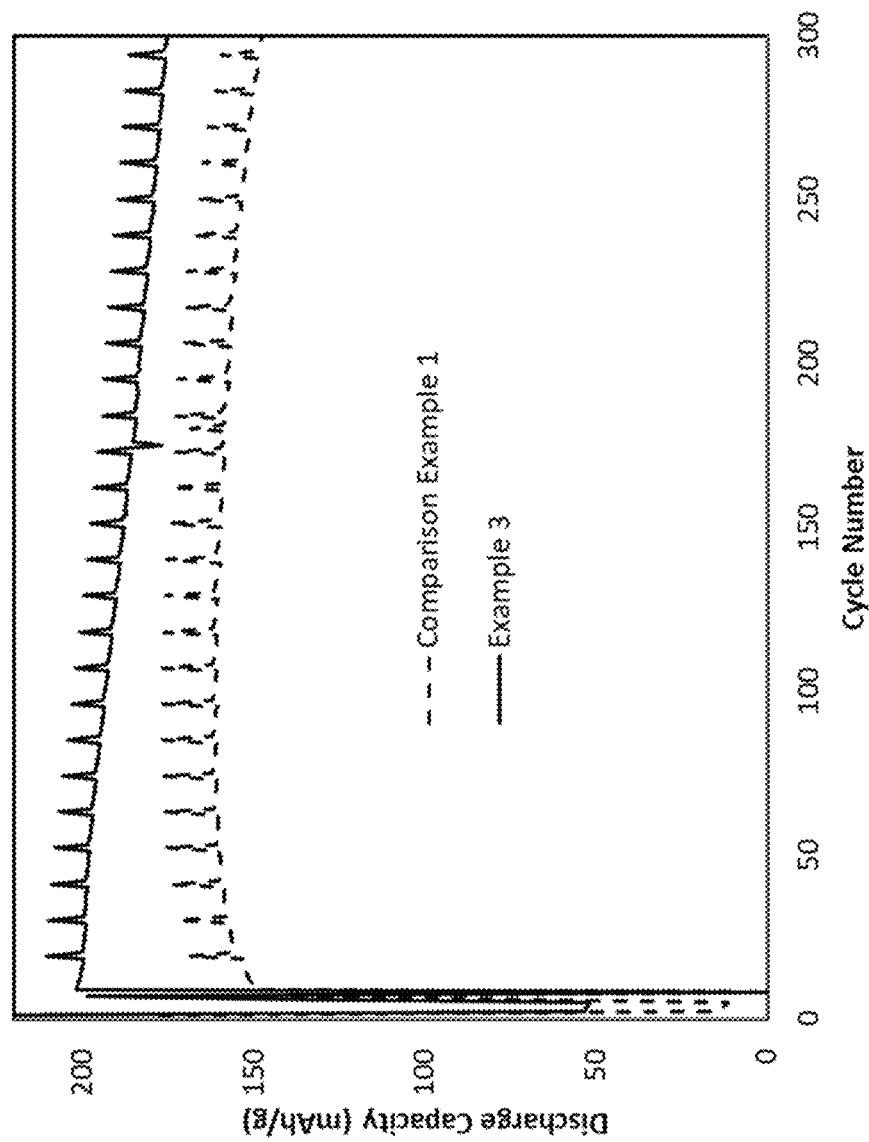
FIG. 8 illustrates full coin cell cycling data for Example 3 (solid line) and Comparison Example 1 (dotted line). Data is shown for full cells with graphite anode (~2 mAh/cm$^2$ cathode loading) cycled at 45° C. from 2.7-4.6 V under a rapid aging test protocol with average C-rate>1. Averaged data from coin cells are shown. Discharge capacity is normalized to mass of active cathode material.

The cycling of the composite material of Example 3 is also compared to the high Mn, but non-composite material of Comparison Example 3 as illustrated in FIG. 8. The composite material of Example 3 shows improved discharge capacity that is higher at 300 cycles than any initial discharge capacity of the non-composite material demonstrating that the presence of the composite material dramatically improves performance.

Figure 9:
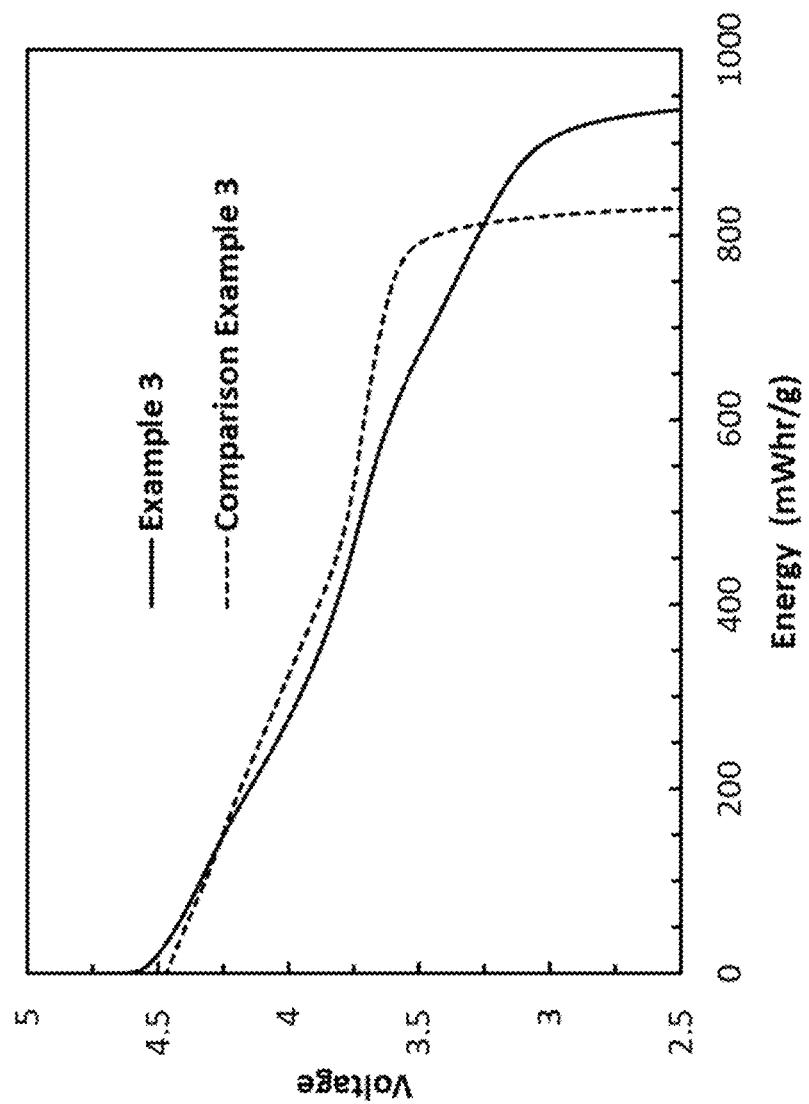
FIG. 9 illustrates half coin cell cycling data for Example 3 (solid line) and Comparison Example 3 (dotted line). Data is shown for half cells with lithium anode (~2 mAh/cm$^2$ cathode loading) cycled at 25° C. from 2.5-4.8 V at a rate of C/20. Averaged data from coin cells are shown. Discharge capacity is normalized to mass of active cathode material.

As illustrated in FIG. 9, half coin cell testing was performed for the composite material of Example 3 and compared to the traditional cathode NMC622 material. Data is shown for half cells with lithium anode (~2 mAh/cm$^2$ cathode loading) cycled at 25° C. from 2.5-4.8 V at a rate of C/20. Averaged data from coin cells are shown. Discharge capacity is normalized to mass of active cathode material. The composite material has similar energy density to NMC622 to about 3.5V and improved energy density below 3.25 V.

Comparison Example 5

A material having the composition of Ni$_{0.36}$Mn$_{0.60}$Co$_{0.04}$(OH)$_2$ was made by first dissolving 2.8 kg NiSO$_4$·6H$_2$O, 337 g CoSO$_4$·7H$_2$O, and 3 kg of MnSO$_4$.7H$_2$O (all available from Barentz) into 13 liters of DI water, creating a 2 M mixed-metal sulfate solution. To a 3 L reaction vessel, a charge solution containing 1.5 L DI water, 150 g NaSO$_4$ (Barentz), and 40 ml NH$_3$OH (14M) (Barentz) was added and stirred until a temperature of 60° C. was reached. At this point, the metal nitrate solution was added to the reactor (~6 ml/min) along with NH$_3$OH (14 M, ~0.18 ml/min) and NaOH (10 M, ~2 ml/min). The solution was stirred at 900 rpm using an over-head stirrer and the pH & ammonia concentration were respectively maintained at ~10.75 and 0.25 M respectively throughout the reaction. Product slurry containing Ni$_{0.36}$Mn$_{0.60}$Co$_{0.04}$(OH)$_2$ was continuously pumped out of the 3 L reactor to keep the reactor volume constant. The solution was filtered, placed into an alumina crucible, and dried at 120° C. overnight. [00108]94.84 g of the resulting powder (Ni$_{0.36}$Mn$_{0.60}$Co$_{0.04}$(OH)$_2$) was added along with 32.71 g of LiOH (dehydrated and milled) to a 500 ml jar and shaken. The mixture was placed into an alumina crucible and sintered. Sintering was performed by heating at a rate of about 5° C. per minute to about 450° C. and held at 450° C. for about two hours. The temperature was then raised at about 2° C./min to about 850° C. and held for about twelve hours with oxygen purge. The sample was then allowed to cool naturally. The resulting sample ($Li_{1.3}Ni_{0.36}Mn_{0.40}Co_{0.04}O_{2+\delta}$) was sieved before being tested in coin cells.

The material as synthesized above was cast into cathode electrodes. The material was first mixed with PVdF, conductive carbon, and NMP solvent to prepare an electrode slurry. The electrode slurry was coated on to aluminum foil using a doctor blade approach. The coated foil was dried at 130° C. to drive off the NMP leaving behind a coated electrode. The electrode was then pressed, punched, and assembled into coin cells with Li metal anode (half cells) or with graphite anode (full cells), and tested.

Example 5: Grain Boundary Enrichment

Grain boundary enrichment of the material of Comparison Example 5 was performed by first adding 5.48 g of cobalt nitrate, 1.06 g of Aluminum nitrate, and 0.86 g of Lithium Nitrate to 90 ml of 40° C. methanol, in a 600 ml freeze drying flask, and dissolving. To this stirring solution, 90 g of $Li_{1.3}Ni_{0.36}Mn_{0.60}Co_{0.04}O_{2+\delta}$ was added and stirred until evenly dispersed. The flask was almost submerged into a 40° C. water bath at 40° angle from normal, and attached to a rotary evaporator to remove the methanol. The rotary evaporator condenser was set to 2° C., 15 mmHg, and 30 rpm. A stir bar was left in the solution for agitation. Once dry, the powder was placed in an alumina crucible and sintered. Sintering was performed by heating at a rate of about 5° C. per minute to about 450° C. and held at temperature for about two hours. The temperature was then raised at about 2° C./min to about 700° C. and held for about two hours with air purge. The resulting $Li_{1.3}Ni_{0.35}Mn_{0.58}Co_{0.06}Al_{0.01}O_2$ was sieved through a #142 and #170 sieve and tested in electrochemical cells.

The material as synthesized above was cast into cathode electrodes. The material was first mixed with PVdF, conductive carbon, and NMP solvent to prepare an electrode slurry. The electrode slurry was coated on to aluminum foil using a doctor blade approach. The coated foil was dried at 130° C. to drive off the NMP leaving behind a coated electrode. The electrode was then pressed, punched, and assembled into coin cells with Li metal anode (half cells) or with graphite anode (full cells), and tested.

Figure 7:
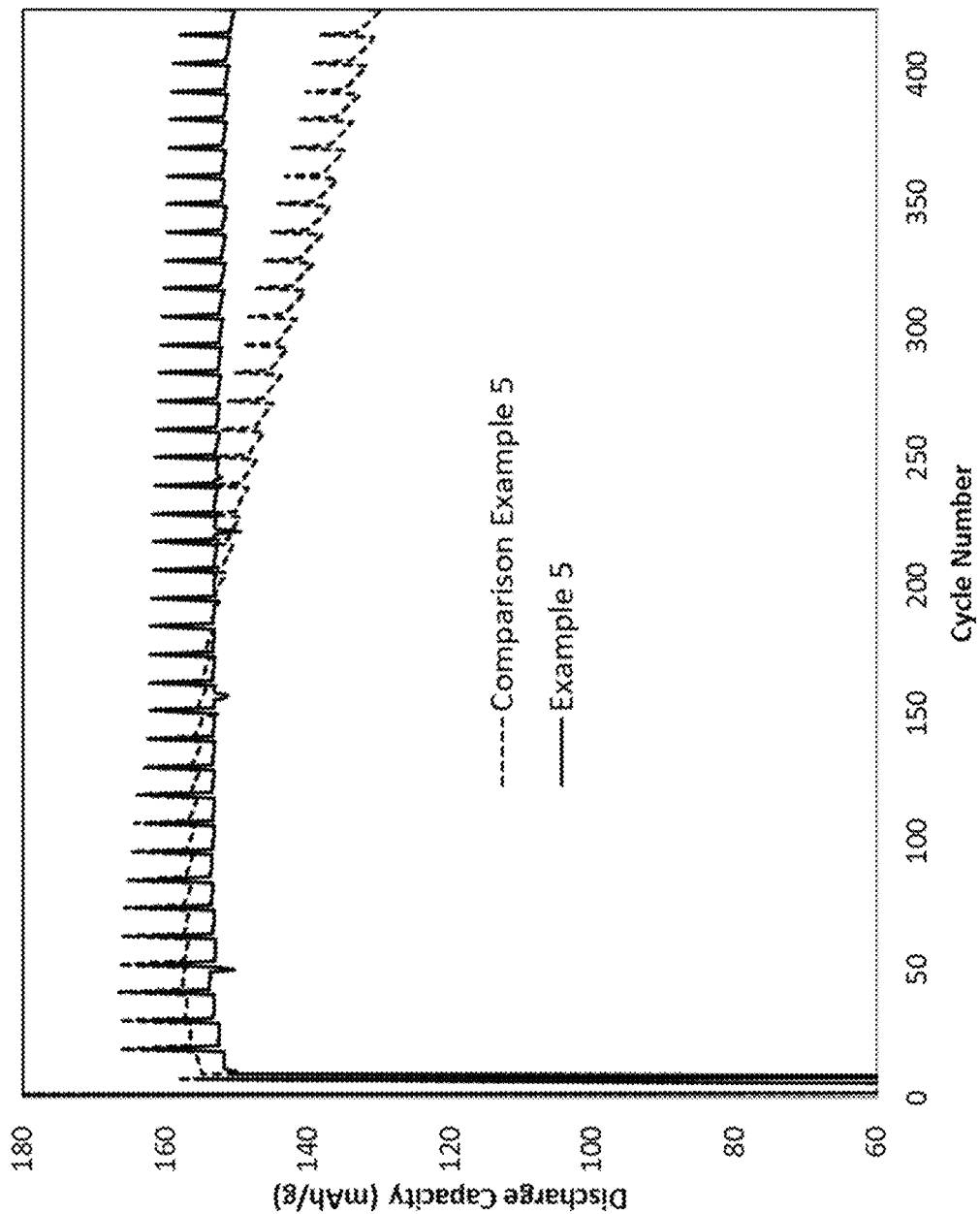
FIG. 7 illustrates full coin cell cycling data for Example 5 (solid line) and Comparison Example 5 (dotted line) Data is shown for full cells with graphite anode (~2 mAh/cm$^2$ cathode loading) cycled at 45° C. from 2.7-4.2 V under a rapid aging test protocol with average C-rate>1. Averaged data from coin cells are shown. Discharge capacity is normalized to mass of active cathode material.

The cycling results of the standard high Mn material of Comparison Example 5 is compared with the grain boundary enriched composite material of Example 5 as is illustrated in FIG. 7. Data is shown for full cells with graphite anode (~2 mAh/cm² cathode loading) cycled at 45° C. from 2.7-4.2 V under a rapid aging test protocol with average C-rate>1. Averaged data from coin cells are shown. Discharge capacity is normalized to mass of active cathode material. While the material of Comparison Example 5 and Example 5 had similar initial discharge capacity, the capacity fade of the Comparison Example 5 material faded rapidly demonstrating that the presence of grain boundary enrichment with Co and Al in a composite material as provided herein dramatically improved overall performance of the cathode material.

Example 6

Additional composite materials were made using the procedures of Example 3 with varying levels of precursors Ni, Mn and Co and grain boundary enriched with Co and Al also as in Example 3. The resulting composite materials have an overall composition of Ni levels from 21 at % to 57 at %, Mn at 40 at % to 75 at %, and Co at either 4 at % or 8 at %, with some samples further grain boundary enriched also with Al. All materials were compositionally confirmed by ICP. The resulting composite materials have the overall compositions as listed in Table 2.

TABLE 2

Additional Exemplary Composite Materials
Composition as measured by ICP $Li_{1.08}Ni_{0.55}Mn_{0.40}Co_{0.04}Al_{0.01}O_2$
$Li_{1.35}Ni_{0.21}Mn_{0.74}Co_{0.04}Al_{0.01}O_2$
$Li_{1.2}Ni_{0.36}Mn_{0.6}Co_{0.04}O_2$
$Li_{1.08}Ni_{0.51}Mn_{0.40}Co_{0.08}Al_{0.01}O_2$
$Li_{1.25}Ni_{0.29}Mn_{0.62}Co_{0.08}Al_{0.01}O_2$
$Li_{1.08}Ni_{0.57}Mn_{0.35}Co_{0.08}O_2$

ADDITIONAL EXEMPLARY ASPECTS

Aspect 1. An electrochemically active composite material comprising:
 a first composition comprising Mn and further comprising a polycrystalline morphology; and
 a second composition comprising Mn, wherein said second composition or a portion thereof comprises a polyhedral morphology;
 said second composition within, on or about a surface of, or intermixed with said first composition.

Aspect 2. The electrochemically active composite material of Aspect 1, wherein said second composition comprises a polyhedral morphology, optionally a faceted polyhedral morphology optionally in the form of an octahedron, truncated octahedron, or twinned elongated square pyramid.

Aspect 3. The electrochemically active composite material of Aspect 2, wherein said second composition has a spinel-type structure.

Aspect 4. The electrochemically active composite material of any one of Aspects 1-3, wherein said second composition has a particle size of about 0.1 μm to about 3 μm.

Aspect 5. The electrochemically active composite material of any one of Aspects 1-4, wherein said second composition is present at about 1 wt % to about 15 wt % of the total of said composite material.

Aspect 6. The electrochemically active composite material of any of Aspects 1-5, wherein the second composition comprises epitaxial growth marks, striation marks, or both.

Aspect 7. The electrochemically active composite material of any one of Aspects 1-6, wherein said first composition comprises $Li_{1+a}MO_{2+b}$ (Formula I) where $-0.3 \le a \le 0.3$ and $-0.3 \le b \le 1.3$, and wherein M comprises said Mn and further comprising Ni; and
 said second composition comprises $Li_{1+c}M'_2O_{4+d}$ (Formula II) where $-0.1 \le c \le 0.3$ and $-0.2 \le d \le 0.2$, and wherein M' comprises said Mn and optionally further comprising Ni.

Aspect 8. The electrochemically active composite material of Aspect 7, wherein M' comprises Ni at from about 0 at % to about 25 at % of M', and Mn comprises about 75 at % to about 100 at % of M'.

Aspect 9. The electrochemically active composite material of any one of Aspects 7-8, wherein Ni in M' is present at about 5 at % to about 20 at %.

Aspect 10. The electrochemically active composite material of any one of Aspects 7-9, wherein M comprises Ni present at about 10 at % or greater or total M, optionally about 30 at % or greater, optionally about 10 at % to about 75 at %, and M further comprises Mn at about 20 at % to about 80 at % of total M.

Aspect 11. The electrochemically active composite material of any one of Aspects 7-10, wherein M further comprises Co.

Aspect 12. The electrochemically active composite material of Aspect 11, wherein Co is present at greater than about 0 at % to about 15 at %, optionally about 0.01 at % to about 10 at %.

Aspect 13. The electrochemically active composite material of any one of Aspects 7-12, wherein M comprises Mn at about 30 at % to about 80 at %, Ni at about 0 to about 75 at %, 0 to about 15 at % Co, and/or 0 to about 5 at % Mg, or any combination thereof.

Aspect 14. The electrochemically active composite material of any one of Aspects 1-12, wherein M comprises about 30 at % to about 80 at % Mn, about 30 at % to about 75 at % Ni, about 0 to about 15 at % Co, and about 0 at % to about 5 at % Mg.

Aspect 15. The electrochemically active composite material of any one of Aspects 1-14, wherein said first composition further comprises a grain boundary, said grain boundary comprising one or more enrichment elements, said one or more enrichment elements present at a higher atomic percentage that any of such elements in an adjacent crystallite, wherein said one or more enrichment elements selected from the group consisting of a transition metal, optionally Co, Al, or both Co and Al.

Aspect 16. An electrochemically active composite material comprising:

a first composition comprising $Li_{1+a}MO_{2+b}$ (Formula I) where $-0.3 \leq a \leq 0.3$ and $-0.3 \leq b \leq 1.3$, and wherein M comprises Ni and Mn; and a second composition comprising $Li_{1+c}M'_2O_{4+d}$ (Formula II) where $-0.1 \leq c \leq 0.3$ and $-0.2 \leq d \leq 0.2$, and wherein M' comprises Ni and Mn;

wherein said first composition comprises a polycrystalline morphology, and said second composition comprise a substantially polyhedral morphology, said second composition within, on or about a surface of, or intermixed with said first composition, and wherein said second composition is present at about 1 wt % to 15 wt % of said composite material.

Aspect 17. The electrochemically active composite material of Aspect 16, wherein said first composition has a particle size ranging from about 1 μm to about 25 μm.

Aspect 18. The electrochemically active composite material of Aspect 16, wherein said first composition comprises a cubic or layered crystal structure, optionally a layered α-NaFeO$_2$-type structure, and wherein said second composition has a spinel-type structure.

Aspect 19. The electrochemically active composite material of any one of Aspects 16-18, wherein said composite material has an overall composition of $Li_aNi_xMn_yCo_zO_b$, wherein $1.18 \leq a \leq 1.35$, $0.3 \leq x \leq 0.5$, $0.45 \leq y \leq 0.65$, $0 \leq z \leq 0.05$, and $1.9 \leq b \leq 2.4$.

Aspect 20. The electrochemically active composite material of any one of Aspects 16-19, wherein Mn in said first composition is present at about 2 at % to about 80 at %, optionally greater than about 30 at % Mn.

Aspect 21. The electrochemically active composite material of any one of Aspects 16-20, wherein M comprises Ni at about 3 at % or greater, optionally about 3 at % to about 80 at % or greater, optionally 10 at % to 99 at % or greater.

Aspect 22. The electrochemically active composite material of any one of Aspects 16-21, wherein M further comprises Co.

Aspect 23. The electrochemically active composite material of Aspect 22, wherein Co is present at greater than about 0 at % to about 10 at %, optionally about 0.01 at % to 7.5 at %, optionally about 0.01 at % to 5 at %.

Aspect 24. The electrochemically active composite material of any one of Aspects 16-23, wherein M comprises about 3 at % to about 80 at % Mn, 0 to about 75 at % Ni, 0 to about 7.5 at % Co, and/or 0 to about 5 at % Mg, or any combination thereof.

Aspect 25. The electrochemically active composite material of any one of Aspects 16-24, wherein M" comprises Ni from about 20 at % to about 70 at %, Co in the range of 0 to about 30 at %, Al in the range of 0 at % to about 10 at %, and Mn in the range of about 30 at % to about 80 at %.

Aspect 26. The electrochemically active composite material of any one of Aspects 16-25 wherein said first composition comprises a grain boundary, said grain boundary comprising a higher atomic percentage of one or more enrichment elements than in an adjacent crystallite, wherein said enrichment element is optionally Co, Al, or both Co and Al.

Aspect 27. An electrode, the electrode comprising the electrochemically composite material of any one of Aspects 1-26, and further comprising a current collector in electrical contact with said particle or plurality of particles.

Aspect 28. An electrochemical cell comprising a first electrode and a second electrode, the first electrode is the electrode of Aspect 27.

Aspect 29. The electrochemical cell of Aspect 28, wherein said second electrode comprises carbon or lithium titanate.

Aspect 30. The electrochemical cell of Aspect 29 wherein said carbon comprises graphite, lithium titanate, or combinations thereof.

Aspect 31. The electrochemical cell of any of Aspects 28-30, characterized by a discharge capacity of greater than 140 mAh/g over 400 cycles or more, optionally greater than 160 mAh/g over 400 cycles or more, when cycled with (~2 mAh/cm$^2$ cathode loading) cycled at 45° C. from 2.7-4.2 V with average C-rate>1, wherein said electrochemical cell comprises a graphite anode.

Aspect 32. A process of forming the electrochemically active composite material of any of Aspects 1-26 comprising:

creating a mixed-metal sulfate solution wherein said metal comprises M;

adding said mixed-metal sulfate solution to a reactor comprising NaSO$_4$, NH$_3$OH or both, wherein the adding further comprises further injecting about 10 M NaOH into said reactor at a rate of less than 2 ml/min (or equivalent rate of NaOH molar addition), further injecting about 14 M NH$_3$OH into said reactor at less than 0.2 ml/min (or equivalent rate of molar NH$_3$OH addition), or both;

and precipitating a precursor composite material in said reactor.

Aspect 33. The process of Aspect 32, wherein a concentration of ammonia in said reactor is maintained at a substantially constant concentration.

Aspect 34. The process of Aspect 33, wherein said substantially constant concentration is at less than 1.0 M, optionally 0.5 M.

Aspect 35. The process of any of Aspects 32-34, wherein said mixed-metal sulfate solution is added to said reactor at a rate of less than about 6 ml/min or equivalent rate to 6 ml/min when said reaction vessel contains about 1.5 L-1.6 L of solution prior to said adding.

Aspect 36. The process of any of Aspects 32-34, further comprising combining said precursor composite material with LiOH and sintering to form a lithiated precursor composite material.

Aspect 37. The process of Aspect 36, further comprising coating said lithiated precursor particle with a solution of one or more enrichment elements and calcining to form said electrochemically active composite material.

Aspect 38. An electrochemically active composite material as described or claimed herein, optionally comprising the formula $Li_aNi_xMn_yCo_zO_b$, wherein $1.18 \le a \le 1.4$, $0.3 \le x \le 0.6$, $0.45 \le y \le 0.65$, $0.02 \le z \le 0.05$, optionally $1.9 \le b \le 2.4$.

Aspect 39. The composite material of Aspect 37, wherein a is about 1.3, x is about 0.39, y is about 0.55, and z is about 0.06.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the scope thereof. Therefore, it is intended that this disclosure not be limited to the particular embodiments disclosed as the best mode contemplated for carrying out this disclosure. It should also be understood that the embodiments disclosed herein should be considered in a descriptive sense only and not for purposes of limitation. Descriptions of features or aspects of each embodiment should be considered as available for other similar features or aspects of other embodiments.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified. Methods of nucleotide amplification, cell transfection, and protein expression and purification are similarly within the level of skill in the art.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The invention claimed is:

1. An electrochemically active composite material comprising:
    a first particle, which is a polycrystalline secondary particle defined by a first composition comprising $Li_{1+a}MO_{2+b}$ (Formula I) where $-0.3 \le a \le 0.3$ and $-0.3 \le b \le 1.3$ and where M comprises Mn at 20 at % to 80 at % and Ni at 30 at % to 75 at %, said first composition formed of a polycrystalline morphology comprising a plurality of crystallites and a grain boundary between adjacent crystallites, said grain boundary with a layered α-NaFeO$_2$-type structure, a cubic structure, or combination thereof and defined by composition $Li_{1+a}M''O_{2+b}$ (Formula III) where $-0.3 \le a \le 0.3$ and $-0.3 \le b \le 1.3$, wherein M" comprises one or more enrichment elements in at least a portion thereof, said one or more enrichment elements present at a higher atomic percentage in said portion than in M of an adjacent crystallite, and wherein said one or more enrichment elements is selected from the group consisting of Co, Al, or both Co and Al; and
    a second particle defined by a second composition comprising $Li_{1+c}M'_2O_{4+d}$ (Formula II) where $-0.1 \le c \le 0.3$ and $-0.2 \le d \le 0.2$, wherein M' comprises Mn at 75 at % to 100 at %, wherein said second composition or a portion thereof comprises a spinel structure and in the form of a three dimensional polyhedron, and wherein said second particle on or about a surface of the first particle.

2. The electrochemically active composite material of claim 1, wherein said second composition comprises a faceted polyhedral morphology.

3. The electrochemically active composite material of claim 1, wherein said second composition has a particle size of 0.1 μm to 3 μm.

4. The electrochemically active composite material of claim 1, wherein said second composition is present at 1 wt % to 15 wt % of said composite material.

5. The electrochemically active composite material of claim 1, wherein the second composition comprises epitaxial growth marks, striation marks, or both.

6. The electrochemically active composite material of claim 1, wherein M in said first composition comprises Ni, Mn and Co; and said M' in said second composition comprises Mn and Ni.

7. The electrochemically active composite material of claim 6, wherein M' comprises Ni at greater than from 0 at % to 25 at % of M', and Mn comprises 75 at % to 100 at % of M'.

8. The electrochemically active composite material of claim 6, wherein Ni in M' is present at 5 at % to 20 at %.

9. The electrochemically active composite material of claim 6, wherein M' comprises Ni present at 10 at % or greater of total M', and said Mn in M is present at 45 at % to 65 at % of total M.

10. The electrochemically active composite material of claim 6, wherein M' further comprises Co.

11. The electrochemically active composite material of claim 10, wherein said Co is present at greater than 0 at % to 15 at %.

12. The electrochemically active composite material of claim 6, wherein M comprises Mn at 30 at % to 80 at %, Ni at 0 at % to 75 at %, Co at 0 at % to 15 at %, and/or Mg at 0 at % to 5 at %, or any combination thereof.

13. The electrochemically active composite material of claim 1, wherein M comprises Mn at 30 at % to 80 at %, Ni at 30 at % to 75 at %, Co at 0 at % to 15 at %, and Mg at 0 at % to 5 at %.

14. The electrochemically active composite material of claim 1, wherein said enrichment element is Co.

15. An electrochemical cell comprising a first electrode and a second electrode, the first electrode comprising the electrochemically active composite material of claim 1, and further comprising a current collector in electrical contact with said electrochemically active composite material.

16. The electrochemical cell of claim 15, wherein said second electrode comprises carbon or lithium titanate.

17. The electrochemical cell of claim 16, wherein said second electrode comprises carbon, wherein said carbon comprises graphite.

18. The electrochemical cell of claim 15, characterized by a discharge capacity of greater than 140 mAh/g over 400 cycles or more when cycled with (~2 mAh/cm² cathode loading) cycled at 45° C. from 2.7-4.2 V with average C-rate>1, wherein said electrochemical cell comprises a graphite anode.

19. The electrochemically active composite material of claim 1, wherein said first composition has a particle size ranging from about 1 μm to about 25 μm.

20. The electrochemically active composite material of claim 1, wherein said composite material has an overall composition of $Li_aNi_xMn_yCo_zO_b$, wherein $1.18 \leq a \leq 1.4$, $0.3 < x \leq 0.6$, $0.45 \leq y \leq 0.65$, $0 \leq z \leq 0.05$, and $1.9 \leq b \leq 2.4$.

21. The electrochemically active composite material of claim 1, wherein Mn in said first composition is present at 45 at % to 65 at % of total M.

22. The electrochemically active composite material of claim 1, wherein M comprises Ni at less than or equal to 40 at %.

23. The electrochemically active composite material of claim 1, wherein M further comprises Co.

24. The electrochemically active composite material of claim 23, wherein Co is present at greater than 0 at % to 10 at %.

25. The electrochemically active composite material of claim 1, wherein M comprises Ni at 30-75 at %, Co at 0-15 at %, Mn at 30-80 at %, and additional elements at 0-10 at %.

26. The electrochemically active composite material of claim 1, wherein M comprises Ni from 20 at % to 70 at %, Co in the range of 0 at % to 30 at %, Al in the range of 0 at % to 10 at %, and Mn in the range of 30 at % to 80 at %.

* * * * *